(12) United States Patent
Miley

(10) Patent No.: US 6,599,404 B1
(45) Date of Patent: Jul. 29, 2003

(54) FLAKE-RESISTANT MULTILAYER THIN-FILM ELECTRODES AND ELECTROLYTIC CELLS INCORPORATING SAME

(76) Inventor: George H. Miley, 912 W. Armory, Champaign, IL (US) 61820

(*) Notice: Subject to any disclaimer, the term of this patent is extended or adjusted under 35 U.S.C. 154(b) by 0 days.

(21) Appl. No.: 09/242,550

(22) PCT Filed: Aug. 19, 1997

(86) PCT No.: PCT/US97/14591
§ 371 (c)(1),
(2), (4) Date: Mar. 18, 1999

(87) PCT Pub. No.: WO98/07898
PCT Pub. Date: Feb. 26, 1998

Related U.S. Application Data

(60) Provisional application No. 60/055,594, filed on Aug. 12, 1997, and provisional application No. 60/023,573, filed on Aug. 19, 1996.

(51) Int. Cl.[7] .............................................. C25B 11/00
(52) U.S. Cl. ............. 204/280; 204/290.01; 204/290.08; 204/290.12; 204/290.14; 204/292; 204/293
(58) Field of Search .................... 428/615, 635, 428/660, 661, 662, 663, 664, 665, 666, 667, 361, 370, 380, 381, 686, 689, 699; 204/290 R, 290 F, 292, 293, 280, 290.01, 290.08, 290.12, 290.14

(56) References Cited

U.S. PATENT DOCUMENTS

| | | | |
|---|---|---|---|
| 4,414,064 A | 11/1983 | Stachurski et al. | 204/37 R |
| 4,943,355 A | 7/1990 | Patterson | 204/20 |
| 4,966,674 A | * 10/1990 | Bannochie | 204/292 |
| 5,036,031 A | 7/1991 | Patterson | 502/10 |
| 5,164,062 A | 11/1992 | Byrd et al. | 204/290 R |
| 5,318,675 A | 6/1994 | Patterson | 204/86 |
| 5,372,688 A | 12/1994 | Patterson | 204/222 |
| 5,618,392 A | * 4/1997 | Furuya | 204/290 R |

OTHER PUBLICATIONS

W. Beck, J. O'M. Bockris, M.A. Genshaw, P.K. Subramanyan, "Diffusivity And Solubility Of Hydrogen As Function Of Composition In Fe–Ni Alloys", *Metallurgical Transactions*, vol. 2, pp. 883–888 (Mar. 1971).
*Comprehensive Treatise Of Electrochemistry*, Vol's 1–4, Ed's. J. O'M. Bockris, B.E. Conway, E. Yeager, Plenum Press. No month/year available.
J. O'M. Bockris, M.A. Genshaw, M. Fullenwider, "The Electro–Permeation Of Hydrogen Into Metals", *Electrochimica Acta*, vol. 15, pp. 47–60 (1970). No month available.
P. Børgesen, R.E. Wistrom, H.H. Johnson, D.A. Lilienfeld, "The Influence Of Hydrogen On Ion Beam Mixing Of Multilayer Films", *J. Mater Res.*, vol. 4, No. 4, pp. 821–833 (Jul./Aug. 1989).
H.C. Brett, H.E. Wegner, J.C. Gursky, "Energetics Of Charged Particle–Induced Fission Reactions", *Physical Review*, vol. 129, No. 5, pp. 2239–2251 (Mar. 1, 1963).
S. Katcoff, "Fission–Product Yields From Neutron–Induced Fission", *Nucleonics*, vol. 18, No. 11, pp. 201–208 (Nov. 1960).
F.A. Lewis, *The Palladium Hydrogen System*, New York, Academic Press (1967). No month available.

(List continued on next page.)

*Primary Examiner*—Bruce F. Bell
(74) *Attorney, Agent, or Firm*—Woodard, Emhardt, Naughton Moriarty & McNett

(57) ABSTRACT

Described are preferred multilayer, thin-film electrodes (11) that have improved resistance to flaking or cracking under conditions of operation. Also described are electrolytic cells (17) incorporating such electrodes (11), and methods for selecting electrode materials to facilitate reaction rates, energy production, and/or to shift the average mass number of transmuted products to lighter or heavier values. Preferred electrodes (11) have a plurality of thin-film conductive layers (14) supported on generally concave surfaces (13).

27 Claims, 20 Drawing Sheets

OTHER PUBLICATIONS

G.H. Miley, E.G. Batyrhekoc, H. Hora, R.L. Zich, "Electrolytic Cell With Multilayer Thin–Film Electrodes", *Transaction of Fusion Technology*, vol. 26, pp. 313–320 (Dec. 1994).

G.H. Miley, J.A. Patterson, "Nuclear Transmutations In Thin–Film Nickel Coatings Undergoing Electrolysis", *J. New Energy 1*, vol. 1 (1996). No month available.

G.H. Miley, G. Narne, M.J. Williams, J.A. Patterson, J. Nix, D. Cravens, H. Hora, "Quantitative Observation Of Transmutations Products Occurring In Thin–Film Coated Microspheres During Electrolysis", *Proceedings Of The ICCF–6*, Hokkadio, Japan, Oct. 14–17, 1996.

A.A. Oglobin et al., *Treatise On Heavy–Ion Science*, vol. 8, D. Bromley, Ed., Plenum Press, New York (1989). No month available.

"Fermi Energy Levels (in eV)", cited in J.C. Slater, *Introduction To Chemical Physics*, $1^{st}$ Edition, McGraw–Hill, New York, New York, p. 44 (1939). No month available.

* cited by examiner

ILLUSTRATIVE COMPLEX NUCLEI PATHWAYS

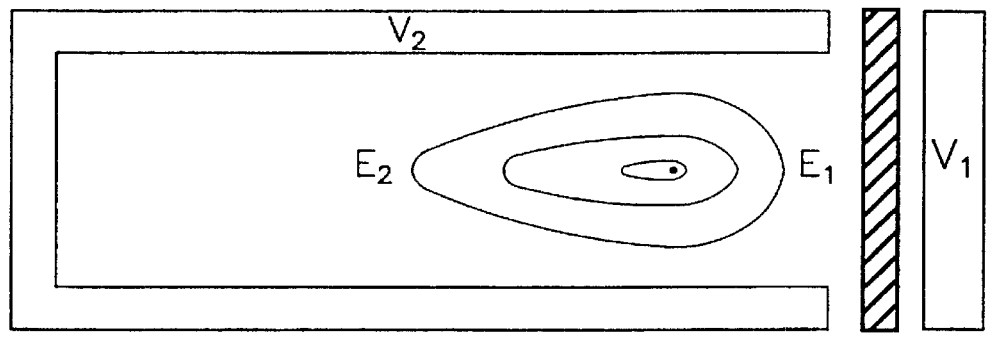
Fig. 3c-a
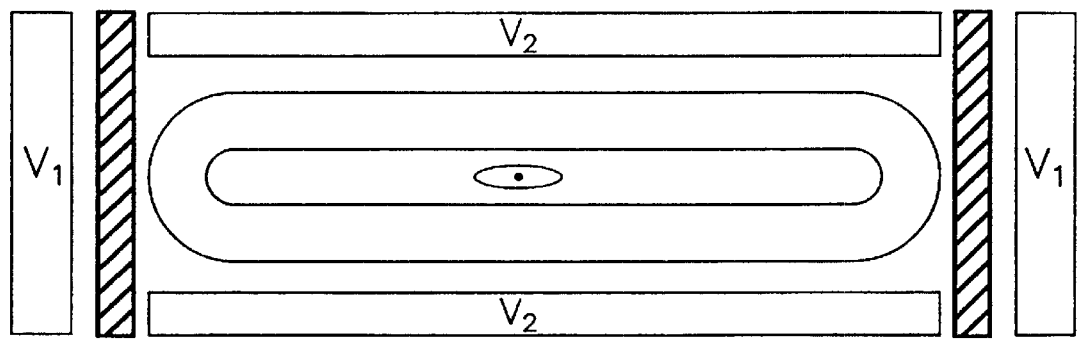
Fig. 3c-b

FLAKE-RESISTANT MULTILAYER THIN-FILM ELECTRODES AND ELECTROLYTIC CELLS INCORPORATING SAME

REFERENCE TO RELATED APPLICATIONS

This application claims priority upon U.S. patent application Ser. No. 60/023,573 filed Aug. 19, 1996 and entitled "Flake-Resistant Multilayer Thin-Film Electrodes and Electrolytic Cells Incorporating Same, and upon U.S. patent application Ser. No. 60/055,594 filed on Aug. 12, 1997 and entitled "Flake-Resistant Multilayer Thin-Film Electrodes and Electrolytic Cells Incorporating Same", each of which is hereby incorporated by reference in its entirety.

BACKGROUND OF THE INVENTION

The present invention relates generally to electrolytic cells. In particular, the invention relates to multilayer thin-film electrodes with a special surface geometry, and electrolytic cells incorporating the same. The electrodes are advantageous, for example, for their ability to resist cracking and flaking of the thin-film structure under a wide range of operating conditions.

In earlier research, Miley et al. used flat stainless steel plates coated with multilayer thin films as electrodes for an electrolytic cell. Such experiments are described in G. Miley, H. Hora, E. Batyrbekov, and R. Zich, "Electrolytic Cell with Multilayer Thin-Film Electrodes", *Trans. Fusion Tech.*, Vol. 26, No. 4T, Part 2, pp. 313–330 (1994). In this prior work, alternating thin-film (100–1000) layers of two different materials (e.g. titanium/palladium) were employed. The materials were selected to maximize the differences in the Fermi energy levels between the layers. Then, according to the "swimming electron layer" (SEL) theory described in the referenced publication, a large electron density would develop at the interfaces between the layers, enhancing exothermic reactions at the interface region during electrolysis. However, in the reported experiments, the thin films flaked off of the electrode plates due to differential expansion of the thin-film layers, caused by differences in expansion coefficients of the metals employed during absorption of H or D via electrolysis and subsequent self-heating.

Recently, others have shown that electrolysis can be successfully carried out with a packed-bed electrolytic cell where small plastic pellets are coated with several micron-thick layers of different materials. See, e.g., U.S. Pat. Nos. 4,943,355; 5,036,031; 5,318,675 and 5,372,688. They state that the reason this is possible is that the plastic pellets allow some expansion of the metal coatings.

Other electrolytic cells have employed coated electrodes of various forms. For example, U.S. Pat. No. 4,414,064 entitled "Method For Preparing Low Voltage Hydrogen Cathodes" discusses a co-deposit of a first metal such as nickel, a leachable second metal or metal oxide, such as tungsten, and a nonleachable third metal, such as bismuth.

In light of these prior efforts, there remains a need for an improved, thin-film (50–1,000-Å-thick layers) electrode configuration, which is optimized according to SEL theory and which resists degradation during operation in an electrolytic cell. The present invention addresses this need.

SUMMARY OF THE INVENTION

Accordingly, one preferred embodiment of the present invention provides a concave-surface conductive article for use as an electrode, which includes an electrode substrate having at least one concave surface, and at least one thin-film conductive layer coated on the concave surface, so as to provide stability against flaking or cracking of the thin-film layer upon expansion. This conductive article can be provided in a variety of forms which incorporate the concave surface(s), for example, pellets, rods, cylinders, fibers, and the like. More-preferred conductive articles of the invention include a plurality of thin conductive film layers, for example with differing metals in adjacent layers, which have large differences in Fermi energy level and simultaneously allow strong hydrogen- or deuterium-absorption in the metal and also good diffusion of these species through the layers.

Another preferred embodiment of the invention provides a flake-resistant thin-film electrode for use in an electrolytic cell, which has an electrode substrate and a plurality of thin-film conductive layers on the substrate. Expansion joints are provided in the thin-film layers, so as to reduce flaking or cracking of the layers during heating or hydrogen-isotope-loading.

Another preferred embodiment of the invention provides a conductive article including at least two thin conductive film layers adjacent to one another, wherein materials in the thin films are selected to provide a substantial Fermi-level difference between the adjacent films, the materials also having diffusivity and solubility of hydrogenous atoms, whereby substantial concentrations of hydrogenous atoms can develop in the films, the materials further being selected to react to provide sets of complex nuclei favoring at least one of energy production and reaction products predominantly having higher or lower masses. For example, in regard to Fermi-level differences, the following combinations are illustrative: Pd/Ni ($\Delta F=1.3$ eV); Pt/Ni (($\Delta F=1.5$ eV); Pd/Fe ($\Delta F=0.9$ eV); Pd/Zr ($\Delta F=1.6$ eV); Pt/Th ($\Delta F=2.4$ eV). As to complex nuclei formation, for example, the Pt/Ni combination would provide a set of reaction products centered around mass numbers A=25, 35, 95 and 155. The Pt/Th combination, illustratively, would favor lower mass numbers in this set, but would give higher energy production than the Pt/Ni combination.

The present invention also provides electrolytic cells which incorporate electrodes of the invention, and methods for operating the cells.

The invention provides electrodes with thin-film coatings which resist flaking and cracking under expansion and thus provide extended electrode lifetimes, and electrolytic cells and, methods incorporating such electrodes. The objective criteria for selection and metal profiles in the present invention are distinguished from those in much prior work in electrolytic cells. The present invention includes a preference for minimal interdiffusion of the metals at the interfaces, such that a locally high electron density (swimming-electron layer) occurs at interfaces due to the selection of metal pairs with large differences in Fermi energy levels. Further, significantly thinner coatings (hundreds of angstroms or less) are preferred in order to maximize the reaction rate of absorbed ions per unit volume. To achieve stable coatings of this type, design considerations, such as the concave surfaces or segmented expansion joints described in the present disclosure, are important.

Additional objects, features and advantages of the invention will be apparent from the description which follows.

BRIEF DESCRIPTION OF THE FIGURES

FIG. 1b provides a cross-sectional view of the pellet of FIG. 1a.

FIG. 2d provides illustrative examples of the reaction kinetics whereby the initial complex nuclei break up into lighter complex nuclei, all of which undergo fission to produce the observed reaction products in FIG. 2c.

FIG. 4d provides an insulating support structure for rod electrodes in an electrolytic cell, such as that of FIGS. 4b–4c incorporating rod electrodes.

FIG. 6b shows an end-view of a flow tube packed with a mesh of fibers. FIG. 6c shows the arrangement of the electrical circuitry in an electrolytic cell employing the fibers. This figure shows a side view of a flow tube packed with a mesh of fibers.

FIG. 7a shows a side view of a rectangular channel strung with rigid (i.e. large diameter fiber-like rods) electrode rods, where the electrolyte flow is perpendicular to the rods. FIG. 7b shows an end view of the arrangement of FIG. 7a.

DESCRIPTION OF THE PREFERRED EMBODIMENTS

For the purpose of promoting an understanding of the principles of the invention, reference will now be made to certain preferred embodiments thereof, and specific language will be used to describe the same. It will nevertheless be understood that no limitation of the scope of the invention is thereby intended; such alterations, further modifications and applications of the principles of the invention as described herein are being contemplated as would normally occur to one skilled in the art to which the invention relates.

Figure 1A:
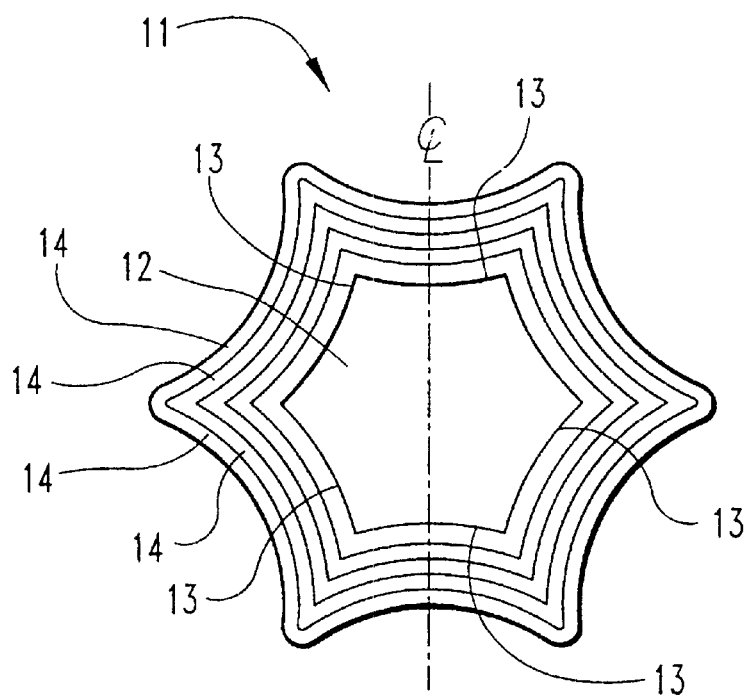
FIG. 1a provides a three-dimensional view of a polyhedral electrolytic cell pellet of the invention incorporating a concave (relative to electrolyte) curvature of surfaces coated with thin films.

The present invention provides novel thin-film coated electrodes in a geometry that will resist cracking and flaking of the thin films when used in electrolytic cells. One preferred embodiment of the invention is illustrated in FIG. 1a, which shows the cross section of an electrode 11 formed with a substrate 12 having a plurality (six shown) of concave (relative to electrolyte) surfaces 13. Coated on the surfaces 13 are a plurality of thin-film conductive (typically metallic) layers 14, each having a thickness in the range of up to about 1,000 Å, e.g. from about 50 to about 1,000 Å. More preferably, layers 14 with higher hydrogen or deuterium ion solubility will each have a thickness of about 500 to about 1,000 Å, while layers 14 of materials with less hydrogen or deuterium ion absorptivity will generally be thinner, e.g. about 50 to about 500 Å.

Figure 1B:
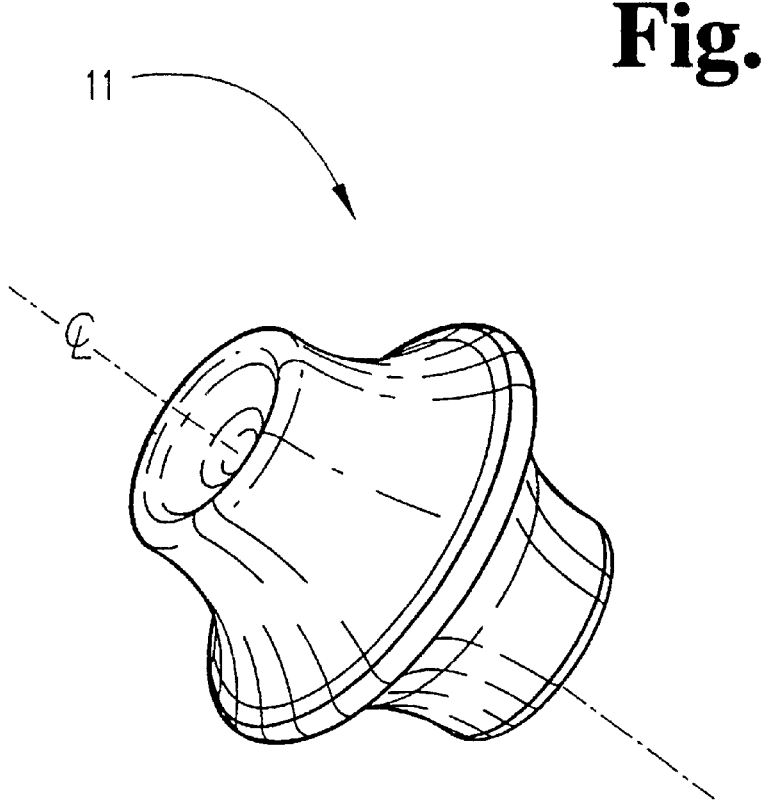
Figure 4A:
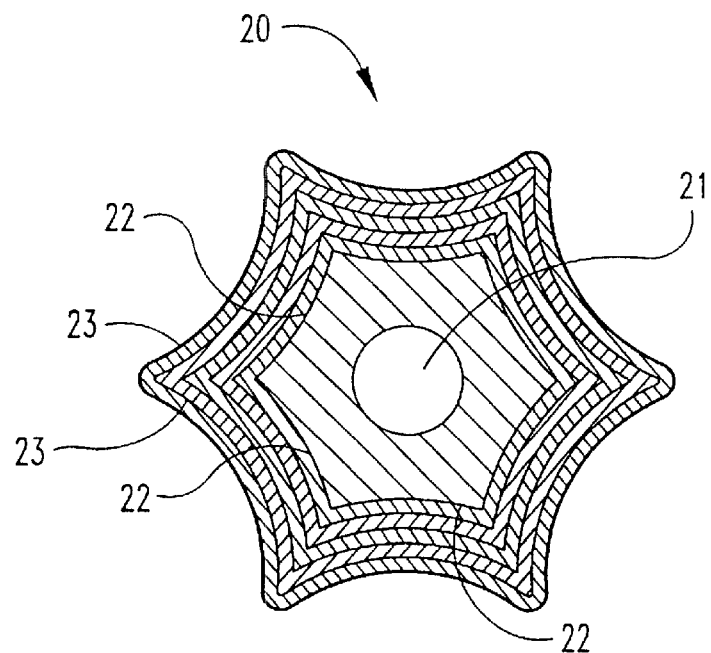
FIG. 4a provides a cross-sectional view of a hollow rod electrode with an interior coolant channel.
Figure 5:
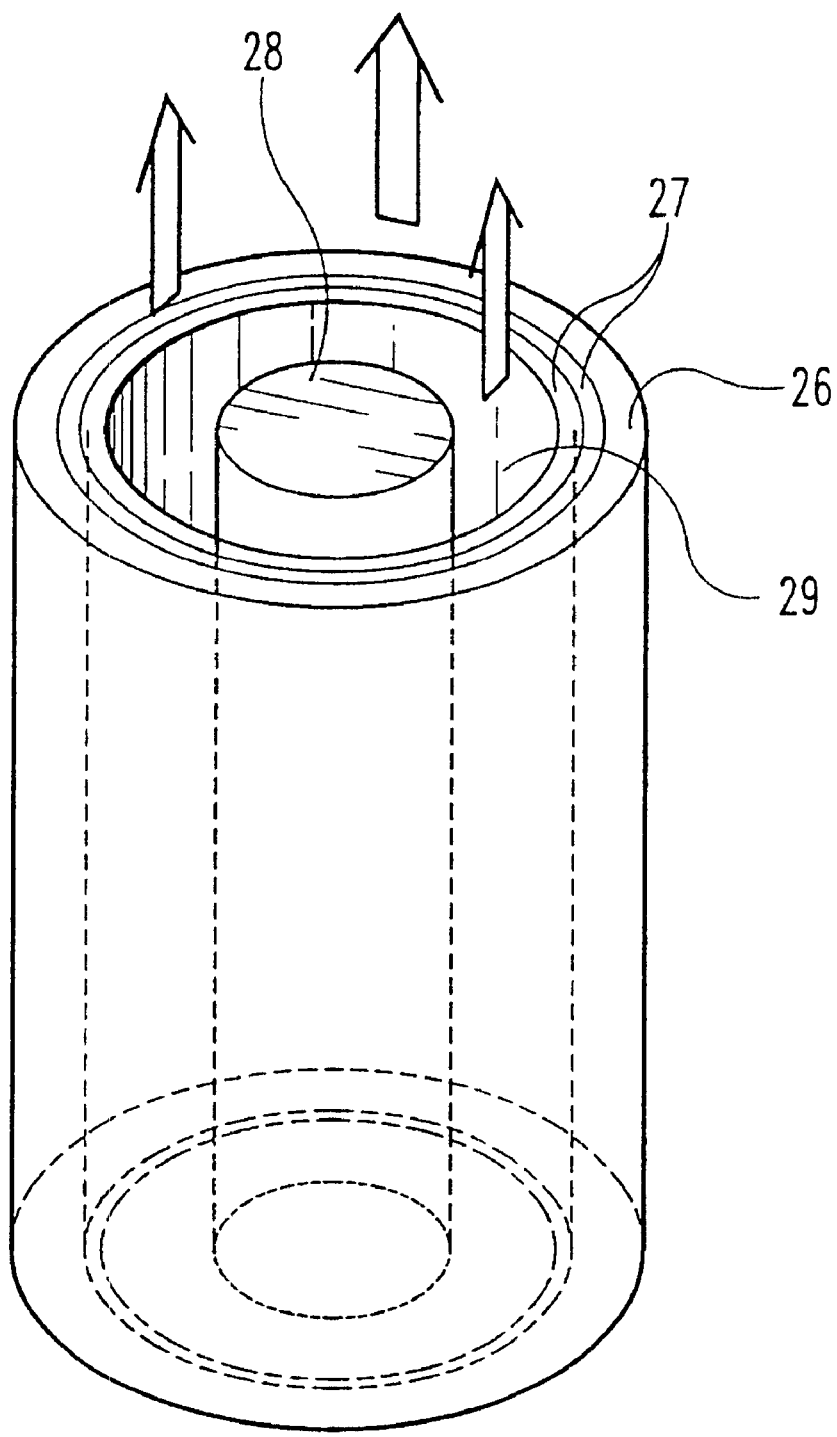
FIG. 5 provides a perspective view of another concave electrode configuration of the invention, wherein the interior surface of a cylindrical electrode substrate is coated with thin-film metallic layers.
Figure 6A:
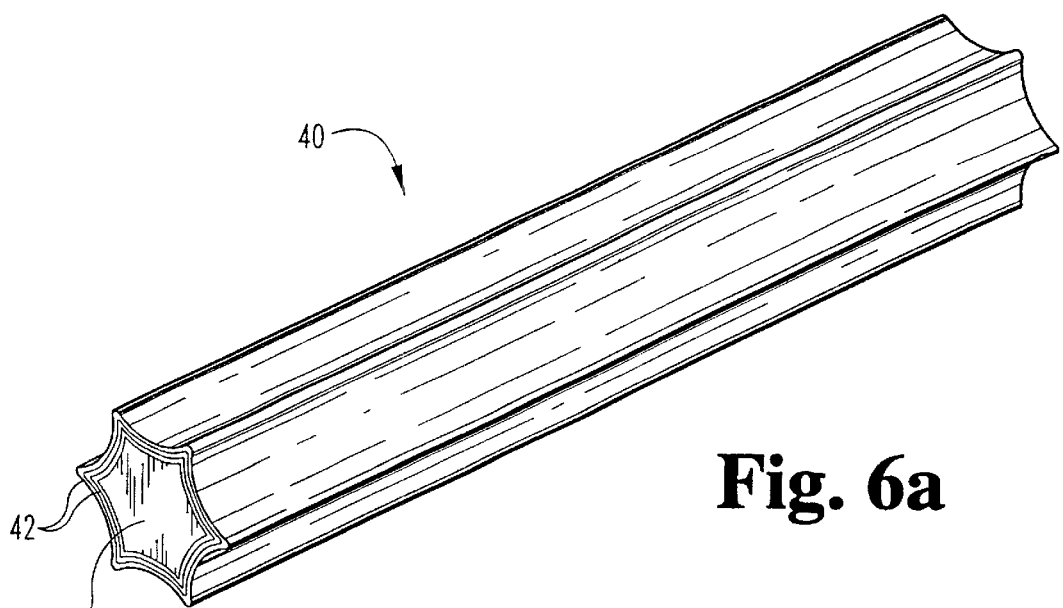
FIG. 6a provides another concave electrode configuration of the invention, including a long, thin fiber with concave surfaces coated with thin conductive films.

The configuration of FIG. 1a can be incorporated into various configurations such as the pellet of FIG. 1b (or rods of FIG. 4l; fiber of FIG. 6a; concentric cylinders of FIG. 5). The illustrated pellet 11 in FIG. 1b includes "dimples" at each end, and two continuous troughs around the pellet, above and below a midplane, respectively. It will be understood that alternate convenient pellet or other geometries which have a plurality of concave surfaces can be used without departing from the spirit and scope of the present invention. The concave surfaces of the pellet 11 provide flexibility of the materials used to construct the pellet 11 and its thin-film layers 14 under conditions of expansion, for instance due to heating and/or loading of the materials with hydrogen or deuterium ions or the like. Further, the curvature of the concave surfaces provides for differential lengths of each thin-film layer; hence, differential expansion of the layers, provided the materials are selected with expansion coefficients that are consistent with this feature (see e.g. FIG. 2a) Further, the curvature predominantly results in compressive forces on the thin-film layers 14 during expansion, increasing the integrity of the layered electrode structure.

Figure 2A:
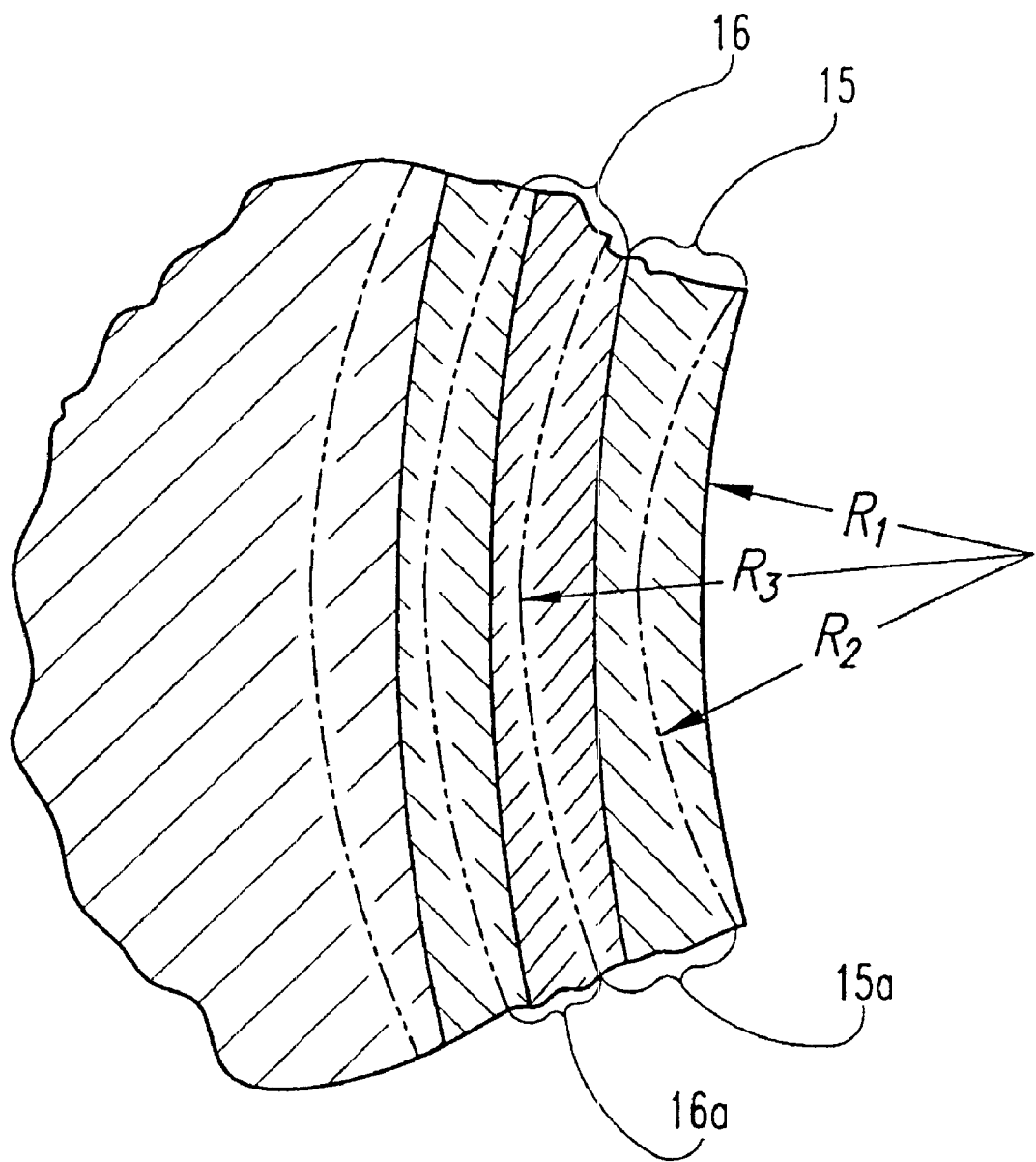
FIG. 2a provides a cross-sectional view of the thin-film layers at the outer edges of a concave surface of the polyhedral pellet of FIG. 1a, relaxed (solid lines) and under expansion (dotted lines).

Referring now particularly to FIG. 2a, note that layer 16 is stretched further as the structure "bows in", (dotted lines for 16a of radius $R_3$ after bowing), than is the case for layer 15, (15a of radius $R_2$ after bowing) due to the differences in radii of curvature ($R_2$ is $R_3$)of the two. If the expansion coefficient of layer 16 is greater than that of layer 15, by selection of the "curvature radius" $R_1$ of the inner surface one can obtain an arrangement where the bowing produces little differential strain between layers 15 and 16. Even if this is not fully achieved, or if a rigid substrate is employed which prevents inward bowing, expansion of the thin-film layers 15 and 16 predominantly produces compressive forces which are less prone to cause cracking and flaking than a convex surface, where outward bowing, and hence strain forces, would develop within the thin-film layers.

An advantageous design of a thin-film coated electrode generally involves the selection of materials with Fermi-level differences and hydrogen and deuterium absorption properties as described in G. Miley, H. Hora, E. Batyrbekov, and R. Zich, "Electrolytic Cell with Multilayer Thin-Film Electrodes", *Trans. Fusion Tech.*, Vol. 26, No. 4T, Part 2, pages 313–320 (1994), plus consideration of the expansion properties of the selected materials. Since considerable compression can be tolerated before buckling and flaking of the thin-film layers occurs, the expansion matching of the materials employed in the thin-film layers need not be perfect. Thus, a fairly wide range of material choices can be considered from among combinations of materials that might be paired to obtain large Fermi-energy-level differences, while still offering good solubility and diffusivity of hydrogen and deuterium ions. Table I below categorizes various materials into groups according to their Fermi Level, and is adapted from "Fermi Energy Levels (in eV)," cited in J. C. Slater, *Introduction to Chemical Physics*, 1st ed., McGraw-Hill, New York, N.Y., 44 (1939).

TABLE I

Fermi Energy Level, eV for Various Groups of Metals

| Low | | Intermediate 1 | | Intermediate 2 | | Intermediate 3 | | High | |
|---|---|---|---|---|---|---|---|---|---|
| Cs | 1.6 | Na | 3.1 | Ta | 5.2 | Pt | 5.9 | Fe | 7.0 |
| Rb | 1.8 | Ce | 3.4 | Ti | 5.4 | Pd | 6.1 | Cu | 7.0 |
| K | 2.1 | Th | 3.5 | Ag | 5.5 | Co | 6.2 | Ni | 7.4 |
|   |   |   |   |   |   | Bi | 6.3 |   |   |
| Sr | 2.5 | U | 3.5 | Al | 5.6 | Pb | 6.3 | Be | 9.0 |
| Ba | 2.3 | Mg | 4.5 | Au | 5.6 | Rh | 6.3 |   |   |
| Ca | 3.0 | Zr | 4.5 | W | 5.8 | V | 6.3 |   |   |
|   |   | Li | 4.7 | Mo | 5.9 | Ir | 6.3 |   |   |
|   |   | Cd | 4.7 | Zn | 5.9 | Os | 6.3 |   |   |
|   |   |   |   |   |   | Ru | 6.4 |   |   |

Pairing high- and low-Fermi level materials gives the maximum difference in Fermi level, for example, Cs/Be gives $\Delta F=7.4$ eV, where $\Delta F$ represents the difference in Fermi energy level. However, from other standpoints, such as ease of manufacture, diffusivity, and solubility, other combinations may be desirable. Thus, alternating layers of Pd/Ni ($\Delta F=1.3$ eV), Pt/Ni ($\Delta F=1.5$ eV), and Pd/Fe ($\Delta F=0.9$ eV) have been used as a compromise among these differing factors. These choices used combinations of metals from the intermediate 3 and high groups. Other convenient choices include intermediate 3 and intermediate 1 metals such as Pd/Zr and Pt/Th ($\Delta F=1.6$ and 2.4 eV, respectively). In any event, it is preferred that material pairs be employed which provide a $\Delta F$ of at least about 1 eV.

It should be noted that similar considerations extend to the interfaces between the thin-film layers, the structural substrate, and the outer surface exposed to the electrolyte or the thin film and barrier surface coating. Since the substrate need not be conductive, materials such as cross-linked polymers, ceramics, or glass can be employed, as well as metals. In this case, again a large $\Delta F$ is desired, but the substrate must also be selected to provide the desired structural properties for the geometry selected.

If a diffusion barrier is used, in addition to its diffusive properties, the material selection should attempt to maximize the $\Delta F$ between it and the thin film even if no diffusion barrier is employed, the outer surface will generally oxidize and/or become coated with material sedimented from the electrolyte (including impurities that plate out), such that a local $\Delta F$ is automatically achieved at this surface between the base metal and the layer created by sedimentation materials.

In summary, advantageous designs will obtain sufficient $\Delta F$ at the outer surface, plus all internal interfaces, to maximize the effective reaction volume.

In addition to $\Delta F$ considerations, the material pairs selected also preferably have the ability to allow the hydrogen or deuterium (H/D) ions entering the electrode as a result of electrolytic action to easily diffuse through the layers, allowing large quantities of the ions to be absorbed in all layers. Consequently, desirable material pairs offer both reasonably high H/D diffusion coefficients (on the order of that for palladium or higher) and an H/D solubility also on the order of that of palladium or higher.

In summary, optimum material pairs for the alternating thin-film coating can be selected based on favorable $\Delta F$, diffusivity, and solubility parameters.

Figure 2B:
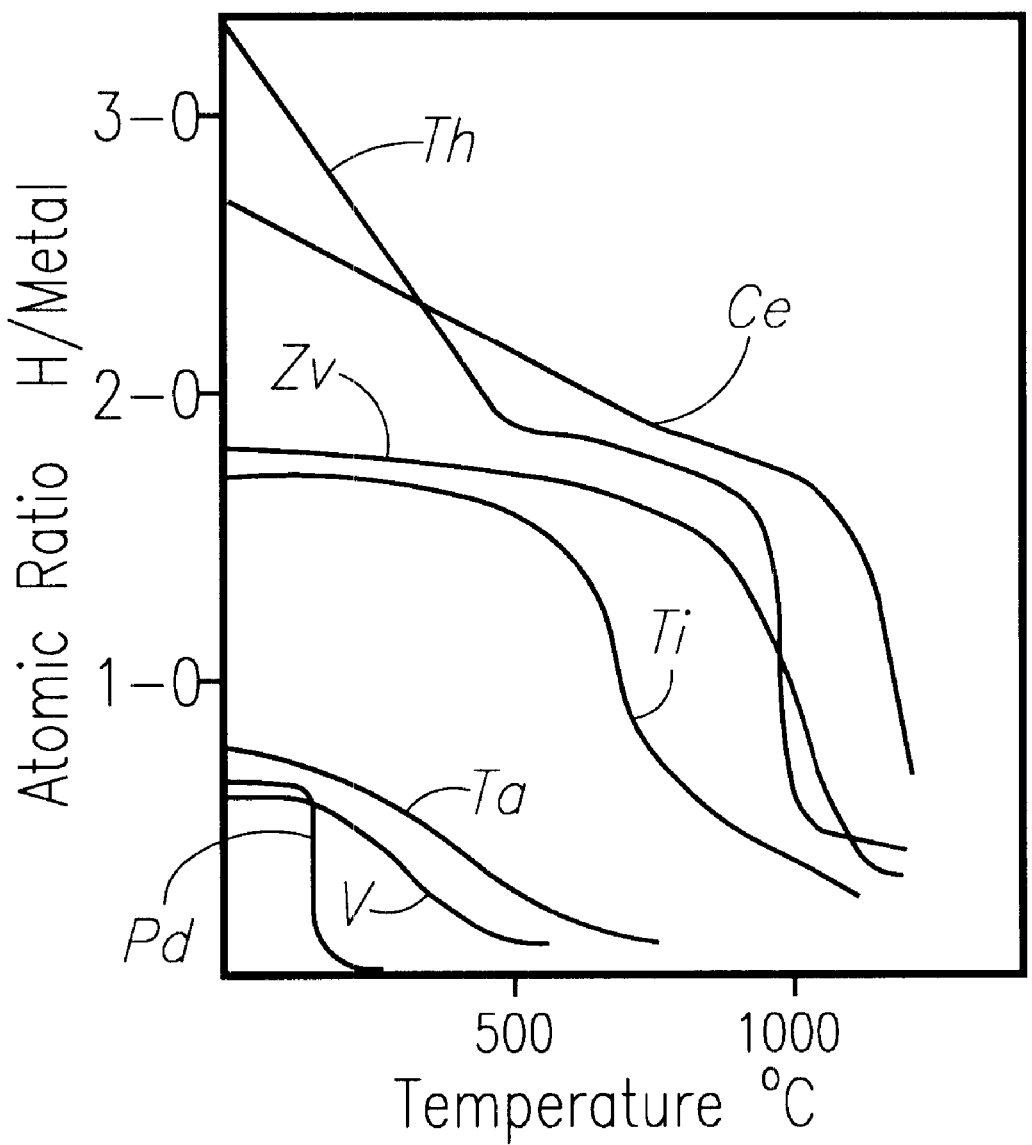
FIG. 2b provides the temperature dependence of the hydrogen-to-metal atomic ratio (H/metal) at atmospheric pressure for Th, Ce, Zv, Ti, Ta, V and Pd. (F. A. Lewis, *The Palladium-Hydrogen System*, New York, Academic Press {1967}.

The diffusivity and solubility parameters for some materials which may be used are given in Table II, while the temperature dependence of H/D solubility is illustrated in FIG. 2b. Since the thin-film layers typically experience an elevated temperature due to a combination of ohmic heating associated with the electrolysis current and heat input from reactions taking place in the layers, the solubility should not decrease drastically at the operational temperature. Combinations of Pd, Ni, Fe, and Ti are examples of materials that meet the desired criteria. For example, Ni and Ti have diffusion coefficients that are close to that of Pd, so Pd/Ni and Pd/Ti offer convenient combinations which can be used in the invention.

TABLE II

Diffusivity, D, and Solubility, C, for Various Materials

| Metal | D (cm$^2$sec$^{-1}$) | C (g atom cm$^{-1}$) |
|---|---|---|
| Pd | $3 \times 10^{-7}$ | $3 \times 10^{-4}$ |
| Ni | $1 \times 10^{-9}$ | $1 \times 10^{-5}$ |

TABLE II-continued

Diffusivity, D, and Solubility, C, for Various Materials

| Metal | D (cm$^2$sec$^{-1}$) | C (g atom cm$^{-1}$) |
|---|---|---|
| Fe—Ni alloy | $1 - 10^{-10}$ | $4 \times 10^{-6}$ |
| Fe$_2$O$_3$ | $1 \times 10^{-18}$ | |
| Cr$_2$O$_3$ | $1 \times 10^{-16}$ | |

J.O'M. Bockris, M.A. Genshaw, and M. Fullenwider, Electrochim. Acta, 15, 47 (1970); W. Beck, M.O'M. Bockris, M.A. Genshaw, and P.K. Subramanyan, Met. Trans., 2, 883 (1971); P.K. Subramanyan, Comprehensive Treatise of Electrochemistry, eds. J.O'M.

Other advantageous material combinations also exist. As seen from FIG. 2b, a variety of materials have a higher solubility than Pd, especially at higher temperatures. Thus, from this standpoint, as well as from the view of their diffusivity, V, Ta, Zr, Ce, and Th are examples of additional materials that are good candidates for pairing with Pd. Examples are Pd/Zr, Pt/Th, and Be/Th (ΔF 1.6, 2.4, and 5.5 eV, respectively).

An additional consideration for selection of the material pairs is the requirement that minimal self-diffusion occurs, such that reasonably sharp material boundaries at the interfaces are maintained. Frequently, thin metallic films tend to diffuse into each other, such that the stability of the interface between them is compromised. This interdiffusion is attributed to both of the metals in the pair having high diffusion coefficients. The Ni/Pd and Ti/Pd material pairs used in work thus far have shown minimal interdiffusion, as measured by Auger electron scanning. This is consistent with other results reported in the literature. Multilayered thin-film structures of Fe/Ti and Pd/Ti pairs have been studied extensively for their stability. (P. Borgesen, R. E. Wistrom, and H. H. Johnson, *J. Mater. Res.*, 4, 821 {1989].) Experiments involved the study of interdiffusion of such films as a result of irradiation and hydrogen loading. Fe/Ti and Pd/Ti pairs were found to be relatively stable, compared to a variety of other combinations.

In summary, once material pairs are selected on the basis of ΔF, diffusivity, and solubility, then minimization of interdiffusion between the pairs can also be considered. If diffusion coefficient data are not available, conventional Auger electron microscopy of sample structures can be performed to measure metal profiles near interfaces to insure that substantial interdiffusion does not exist.

Based on the foregoing reasoning, plus the need for easy fabrication, work to date has generally employed alternating layers of Pd/Ni (ΔF=1.3 eV) or Pd/Ti (ΔF=0.7 eV). These choices have produced the desired reactions, although the ΔF is modest, compared to other high ΔF combinations that could be selected from Table I. For example, combinations such as Pd/Zr, Pt/Th, and Be/Th (ΔF 1.6, 2.4, and 5.5 eV, respectively) are other attractive combinations.

While the preceding considerations, based on Fermi-level physics for thin films, are advantageous for initiation of reactions, additional factors can be incorporated to understand how to control which reaction results and its characteristics. Reaction data from earlier thin-film-coated-bead electrolytic experiments reported by Miley (G. H. Miley et al., *Journal of New Energy*, Vol. 1, No. 3, p. 5; G. H. Miley et al., *Proceedings of ICCF-6*, Hokkadio, Japan, Oct. 14–17, 1996) can be interpreted to provide additional guidance into the selection of materials for control. Further details of the experimental are given in the Experimental section below. Using this data, the binding energy differences between products and reactants can be used to explain the heat observations from the experiments. Using this data, it is believed that one can also show that the systematics of the compound nuclei involved in the reactions can be used to predict how the choice of thin film and substrate materials affects both the reaction product distribution and the excess heat, and thus the present invention also provides methods for selecting film and/or substrate materials based on such compound nuclei considerations, and resulting products.

Figure 2C:
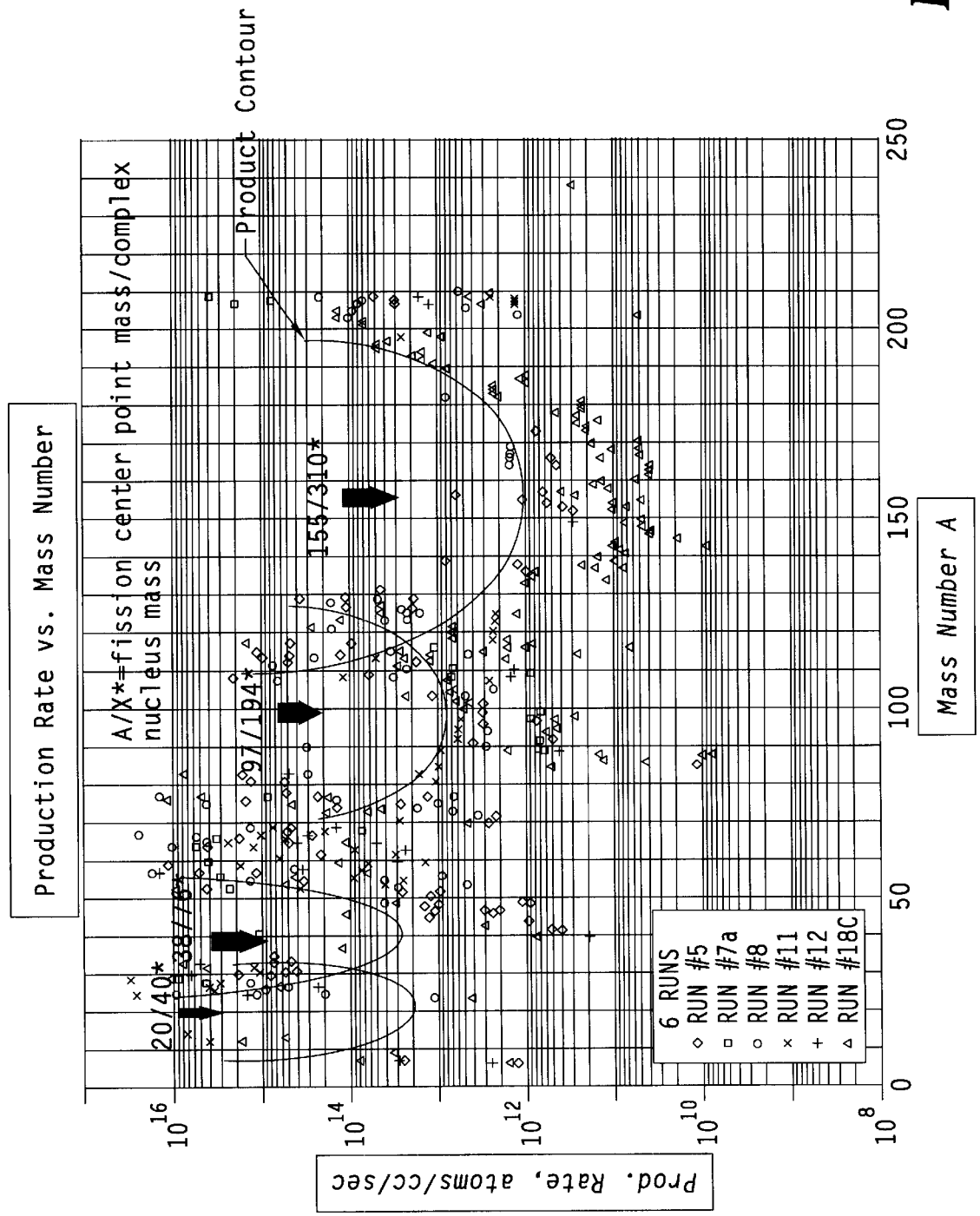
FIG. 2c provides a plot of reaction products produced in six thin-film electrolytic cell runs, showing their production rate (atoms/cc/sec) as a function of mass number, A. Identified in the figure are the complex nuclei (40*, 76*, 194*, 310*) that have been identified to account for the characteristic pattern of high reaction rates in select regions of mass number.

The production of transmuted elements in six thin-film experiments reported in the references cited in the paragraph above and in the Experimental below is summarized in FIG. 2c, which plots the rate of production (proportional to yield) of a product element (atoms/cc/second) versus the element mass number A. Runs shown include Ni, Pd, and Ni/Pd thin films on plastic beads. The characteristic peaks of high yield can be explained in terms of the fission of complex nuclei created by proton reactions with the film and substrate materials. Thus, as illustrated in FIG. 2c, for the data shown, these complexes (labeled X*) approximately lie at mass numbers 40, 76, 194, and 310. (The mass values given are illustrative. A complex may extend over a local range of mass values corresponding to a range of marginal stability—e.g. 310+−20—associated with nucleon pairing in this complex state. This interpretation is similar to the "islands of stability" for neutron rich nuclei proposed by A. A. Oglobin and Y. E. Penionzhkevich, in *Treatise on Heavy-Ion Science*, Vol. 8, D. Bromley, Ed., Plenum Press, N.Y., 1989.) These complex nuclei undergo a slow fission process, producing an array of product elements centered around a mass that is ½ of the complex mass, i.e. on both sides of A=20, 38, 97, and 155. Thus, these center values are located in "valleys" between the corresponding product peaks. (This yield spectrum is consistent with the famous yield curves for energetic neutron-induced fission of uranium, November 1960, page 201.) However, as shown by Y. Kucherov, *Proceedings of ICCF-6*, Hokkadio, Japan, Oct. 14–17, 1996, the lower excitation energy and slow process involved make the characteristics, e.g. lack of high-energy radiation and near stable products, of the present process quite different from the neutron-induced case. The spread of products around the center line value occurs in both cases, simply being a consequence of mass conservation during binary breakup of the complex or compound nucleus. Thus, the "normal" neutron-uranium-235 fission yield curve centers around A=118, half of the n+U-235 mass. In both cases, tertiary breakup occurs to a lesser extent, but this is indicated in the present case, as seen in FIG. 2c by the small peaks occurring at the center line mass value, e.g. note the sharp, low amplitude peak at A=155. A similar effect has been reported for medium energy deuteron-induced fission of radon with the center line peak increasing with decreasing bombardment energy—see H. C. Britt et al., *Phys. Rev.*, Vol. 129, p. 2239 (1963).)

Figure 2D:
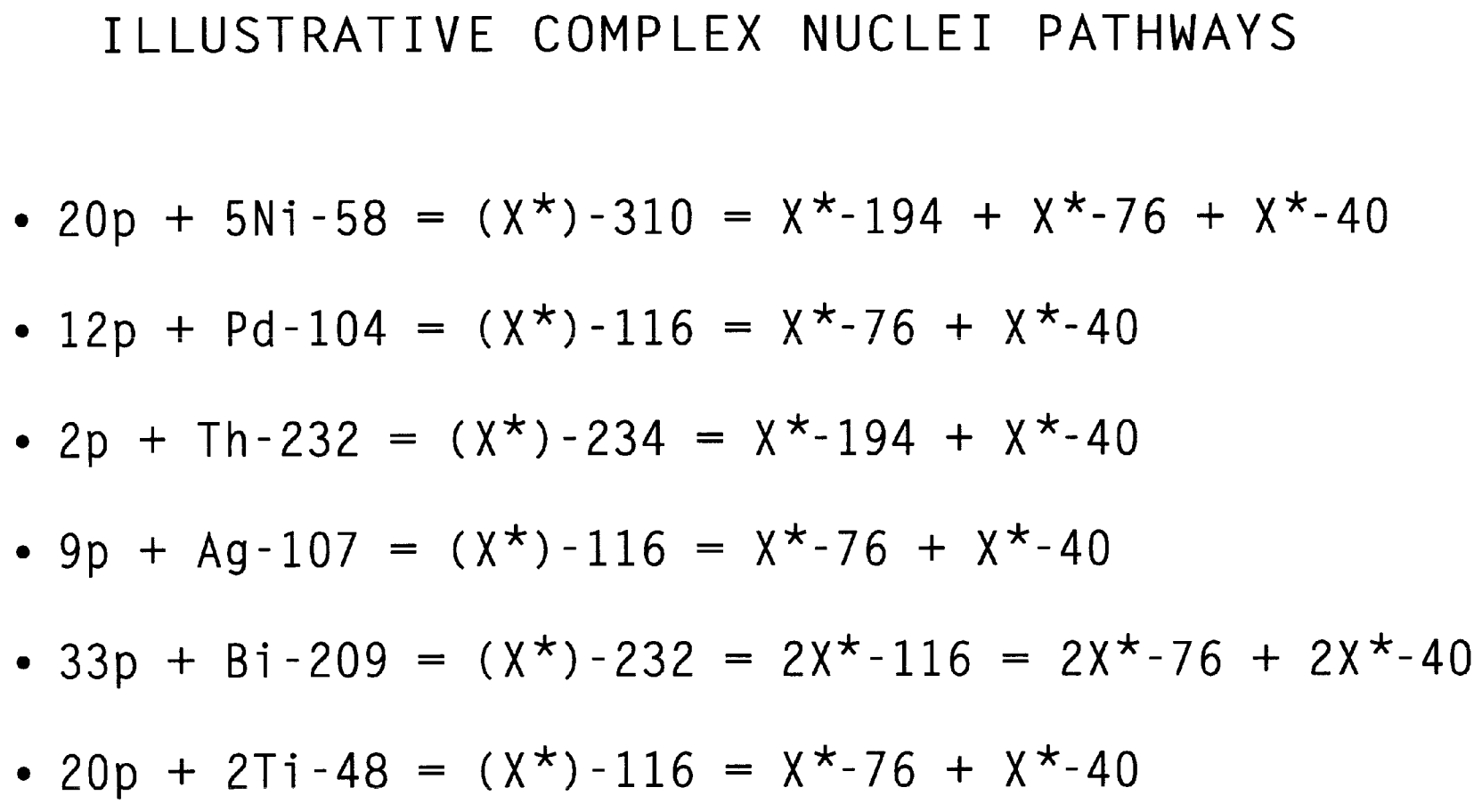

The expected kinetics involved in the fission of these complexes is illustrated in FIG. 2d. Consider the Ni thin-film case as an example. The intermediate complex X*−310 (i.e. lying at mass 310) is formed by a "net" reaction of 5 Ni-58 nuclei with 20 protons. (This equation represents the overall result of the initiation reaction. The detailed reaction kinetics for this unique process, which may involve multiple steps, are not yet fully determined.) Then, as shown, X*−310 undergoes decay by two channels, one a direct fission into reaction products (RPs), the second a splitting into three lower mass complexes, X*−194, X*−76, and X*−40. The latter three complexes then also undergo fission into respective center point masses of the complexes, i.e. 155, 97, 38, and 20. This result can also be used to explain differences in the data in FIG. 2c for Pd films (run #11) versus the Ni data (runs #8 and 18c). Note that the yield peaks for Ni are almost all of equal height, but the product peaks from Pd at higher mass are almost an order of magnitude lower in production rate than are the lower mass Pd product peaks. This is consistent with the reaction shown in FIG. 2d whereby Pd can immediately access X*–116; thus, predominantly decomposing into X*–76+X*–40, the two lower lying complexes (versus Ni which accesses all four complexes).

Similar considerations can be applied to other reactants, e.g. Th, Ag, Bi, and Ti are included in FIG. 2d. Thorium forms the lowest and the medium mass complexes (X–194* and X–40*), whereas the remaining three elements favor the lower mass complexes (X–76* and X–40*). These observations are also in qualitative agreement with other unpublished results, lending confidence to this analysis. The expectation is that the reaction product distribution can be broadly controlled by selecting a reactant (or reactants) that leads to the complex or complexes that are desired. Thus, if lower mass elements are desired, as shown here, use of Pd, Ag, Bi, or Ti (versus Ni or Th) can lead directly to the lower mass complexes, thus giving a mass distribution or RPs favoring lower mass elements. These general considerations can easily be extended to other elements, provided they can absorb large amounts of hydrogen can satisfy the other criteria discussed early such that reactions are initiated. Since the Fermi-level differences will govern the initiation process, they will determine the overall reaction rate, whereas complex nuclei considerations will determine the product mix.

Figure 2E:
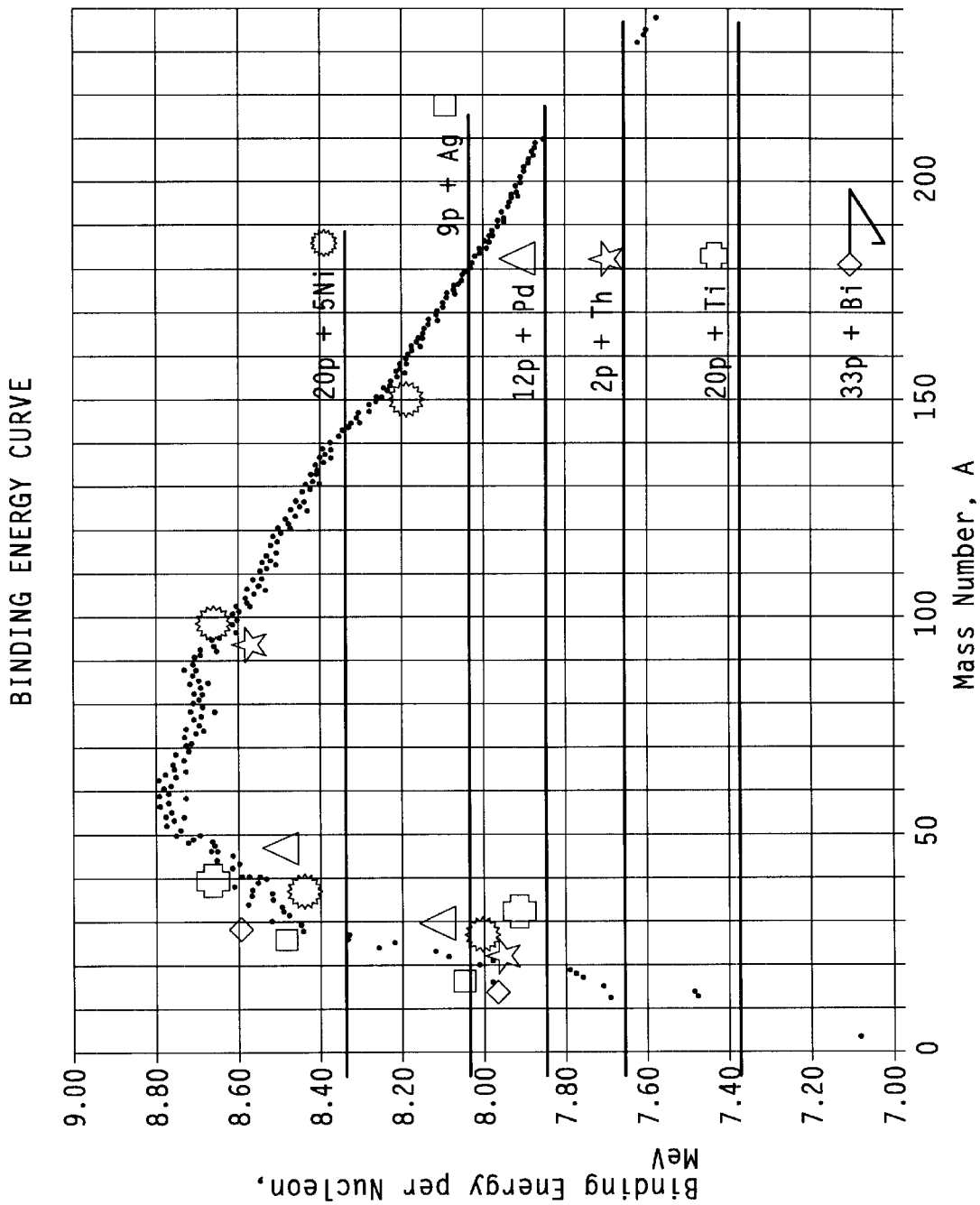
FIG. 2e provides a plot of the binding energy per nucleon as a function of mass number, A, for stable isotopes. Superimposed upon this plot are average binding energies for the reactants listed in the examples of FIG. 2d. Mean binding energies of the corresponding reaction products are indicated by symbols keyed to the reactants. The difference between these binding energies is a measure of the energy available for extraction from a cell undergoing a given reaction.

The complex nuclei analysis also provides insight into selection of materials for maximizing energy production. The basic concept is illustrated in FIG. 2e, which shows the well-known curve of binding energy per nucleon versus mass number. Energy is released if the sum of the binding energies for all of the products exceeds the sum of the binding energies of all reactants. Average binding energies per nucleon for the reactants using various metallic films is shown in the figure as horizontal lines, while the mean energies for products are shown as stars, diamonds, etc. at the mean mass of the RPs, i.e. at the valleys in the yield curve of FIG. 2c. The total number of nucleons must be preserved in this process, but since averages are employed in the figure, this level of detail does not explicitly enter. If the reaction products were produced at a mass corresponding to the intersection of the horizontal line for reactants with the binding energy curve, no net energy would result. However, if on average, products lie at a binding energy above this intersection, a positive output energy will occur, increasing as the difference increases. Consider Ni as an example. The four RPs data points are almost equally located above and below the reactant line, with only a slight positive bias at higher masses. Consequently, energy production with Ni would only be expected to be modes, and as reported in the above-cited ICCF-6 paper, that was indeed the case (see also Table 3 below). The other combinations with the illustrative metals in the figure indicate various degrees of increased production compared to Ni. Indeed, thorium and Bi, which appear to be quite favorable in FIG. 2e, have shown good energy production in experiments, lending confidence to this analysis.

While the preceding examples are for single materials, the extension to multilayer films is straightforward. The overall material selection process can take into account all of the various considerations provided here (favorable Fermi-level difference, diffusivity, solubility plus mating of masses with desired complex nuclei masses) in an optimal design to obtain a particular desired objective—e.g. for optimal production of a certain mass range of products, or for optimal energy production, or for a combination of the two.

The electrodes of the invention can generally be manufactured using a combination of conventional techniques, and the particular methods employed will depend on the electrode geometry at hand. Rod (hollow or solid) and fiber electrode geometries can in general be prepared using conventional electrochemical methods, sputtering, or plasma spray processes to coat an extruded or otherwise formed electrode substrate.

The pellet electrode geometry (FIG. 1) is somewhat more complex. Such electrodes may be manufactured, for example, by first forming or machining a model of the pellet out of a metal, plastic, ceramic or, alternately, a low-melting-point material such as Wood's metal™. This model can then be coated by electron beam sputtering or another convenient method with an electrode substrate material having a substantially higher melting point than the model core. If desired, the low melting point substrate material can be melted and drained out through a small hole in the coating. Alternately if desired, the substrate material can be retained as an integral point of the electrode.

In addition to providing structural support for the thin film coating, the substrate provides an additional swimming electron region through the $\Delta F$ created at the substrate-film interface. Thus the substrate material should be selected with the objective of maximizing $\Delta F$ while providing adequate structural strength and ease of manufacture. Operational temperature requirements are an added consideration. To maximize energy conversion efficiency, use of the highest practical operating temperature is desirable. Suitable substrate materials for purposes herein include, for instance, stainless steel, graphite, boron, zirconium, plastic, ceramic, glass, titanium, nickel and the like.

If desired, a plurality of conductive thin films can be sequentially applied on top of the coating/substrate layer, using conventional methods such as those used to coat plate electrodes, for instance as described in *Trans. Fusion Tech.*, Vol. 26, No. 4T, Part 2, pages 313–320 (1994).

In addition, a diffusion barrier film that has a low diffusion coefficient for hydrogen or deuterium, for instance chromium, silica, glass or the like, can be applied overtop the plurality of thin-film conductive layers. It has been shown experimentally that such a layer will allow reasonable formation and inward transport of hydrogen or deuterium ions under the electric field conditions at the electrode surface, while retarding excessive outward diffusion of these ions. This, then, enhances the ability to obtain a high hydrogen- (or deuterium-)to-absorber-atom ratio. Values above 0.8 hydrogen/deuterium atoms per host atom (palladium, nickel, etc.) are generally viewed as conducive for achievement of strong reactions, hence heating, in the thin films.

Figure 3A:
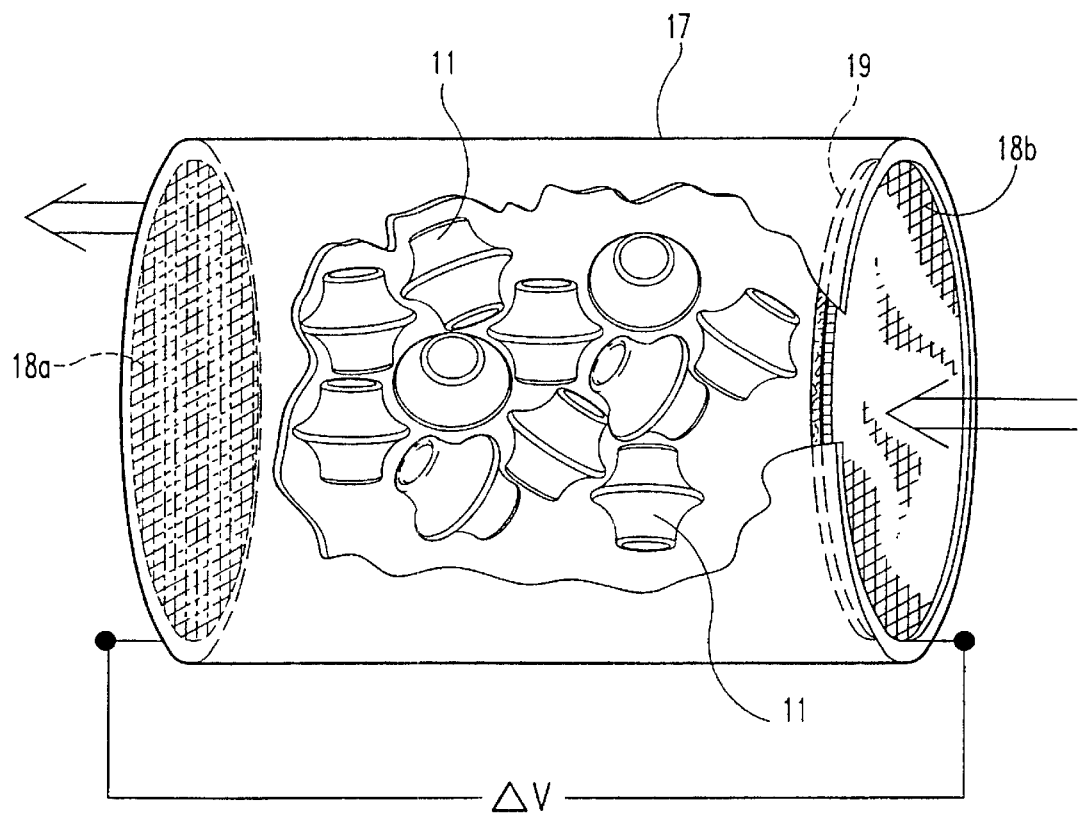
FIG. 3a provides a schematic view of a packed bed electrolytic cell incorporating the pellets of FIG. 1.

As illustrated in FIG. 3a, electrode pellet 11 can be used in a flowing electrolytic cell incorporating a packed bed of pellets 11 within a cell housing 17. The packed bed of pellets 11 allows flow area, and the packing fraction may be fairly large, leading to a large electrode surface area, which is desirable to provide a high reaction rate per unit volume. In addition, the packed bed of pellets 11 provides a small pressure drop at the modest flow rates that are typically employed in flowing electrolytic cells.

In order to assure good electrical conductivity throughout the packed bed, a slight mechanical pressure is applied across the packed pellets by applying pressure to the inlet/outlet screens 18a and 18b. This procedure insures that good pellet-to-pellet physical contact is maintained, minimizing the pellet-to-pellet contact resistance. To maintain an electrical potential (e.g. cathodic) on the thin-film surfaces of the pellets 11, an electrical connection using screens 18a and 18b and a porous (to allow electrolyte flow) insulating layer 19 can be employed as shown in FIG. 3a. Thus, for example, a cathodic potential can be applied to screen 18a, which is in electrical contact with pellets 11. In this manner, pellets 11, and particularly their thin-film conductive layers 14 (FIG. 1a), carry a cathodic potential. At the same time, an anodic potential is provided to screen 18b, which is electrically insulated from pellets 11 by porous insulating layer 19, which can be formed of a screen or mesh of electrically insulating material. The wall of the cell housing is constructed of an insulating material or is otherwise electrically isolated from the screen electrodes 18a and 18b. The electrolyte plus the conducting pellet surfaces provide the electrical current path in the volume of the cell. Thus, an electrolytic cell is provided with a potential profile, illustrated in FIG. 3b, created between anodic screen 18b and cathodic pellets 11. In this regard, it will also be understood that, if desired for certain applications, the polarity of the cell could be reversed, with the pellets 11 carrying an anodic potential and the screen 18b a cathodic potential.

It will also be understood that it is desirable to maximize the average electric field (i.e. potential gradient) across the coated pellet surfaces. Since this field provides a "drawing force" for diffusion of H/D ions into the metallic films, maximizing the average electric field in turn maximizes the H/D loading in the metallic films. One method of maximizing the average field employs a back-to-back connection of units, such as that shown in FIG. 3a, to obtain an arrangement such as that shown in FIG. 3c. The logic for this electrical configuration can be understood by reference to FIGS. 3c–a and 3c–b.

Figure 3B:
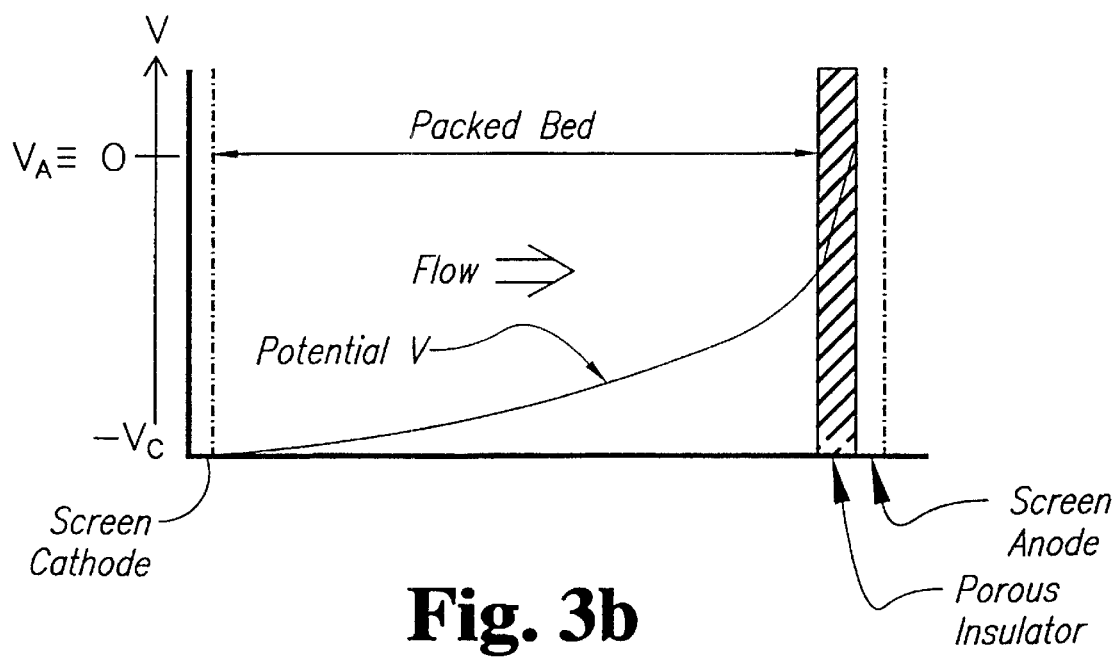
FIG. 3b provides a typical voltage (v) profile for an electrolytic cell such as that shown in FIG. 3a ($V_A$=anode voltage; $V_C$=cathode voltage).
Figure 3C:
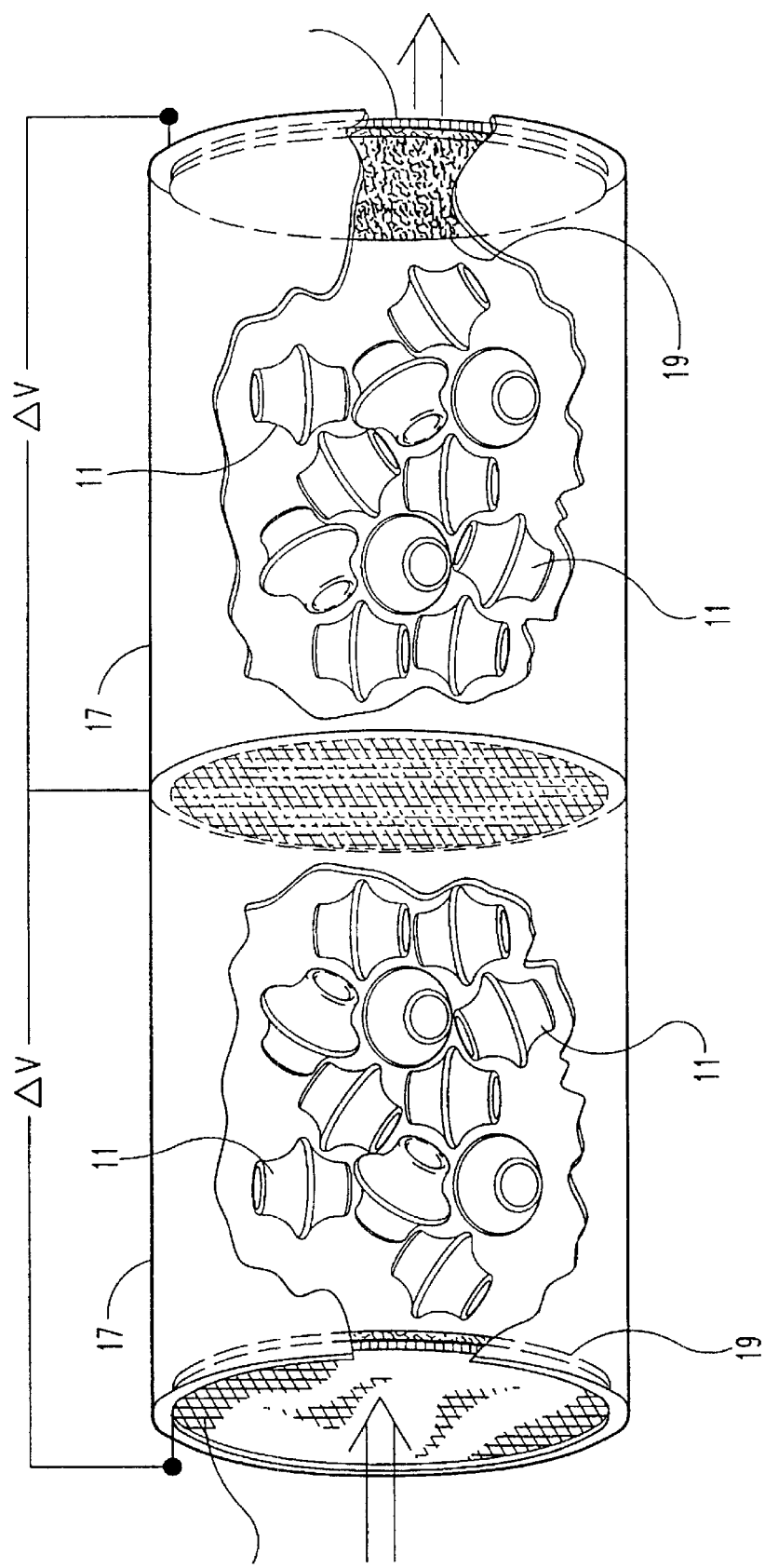
FIG. 3c provides a back-to-back arrangement of the cell of FIG. 3a designed to optimize the average electric field on the pellet surfaces, as illustrated schematically in FIGS. 3c–a and 3c–b ($V_1$=voltage at electrode 1; $V_2$=voltage at pellet surface).

In FIGS. 3c–a and 3c–b, the conductive pellets are represented schematically as solid conductors at $V_2$, separated as a strip channel between the conductors. In 3c–a, a conductor at $V_2$ (representing a screen electrode) is in direct contact with the pellet conductor strips and the electrolyte strip, while a porous insulator is used to separate the electrode at $V_2$ from the electrode at $V_1$ on the right. This configuration corresponds to FIG. 3a. Equal potential surfaces are shown illustratively in the electrolyte, and it is observed that they are shifted to the right, giving stronger electric fields on bead surfaces on the insulator end of the cell than on the opposite end (e.g. $E_1 > E_2$). Consequently, higher H/D loadings are expected in pellets at the insulator end than in pellets located on the opposite end of the cell. Thus, to obtain a more efficient use of the packed bed, a second "unit" can, in effect, be turned and connected to the first, as shown in FIG. 3c, resulting in the corresponding equipotential schematic of FIGS. 3c–b. This arrangement is similar to locating an internal electrode in the cell in order to control the axial potential profile, i.e. control the electric field on the surface of the beads as a function of axial position. This then provides a means of maintaining a high average electric field over the beads in the active cell volume near the electrodes, maximizing the H/D loading in these beads. The extension of this technique to multiple electrodes within the cell volume is straightforward and provides a route to efficient large volume cells.

In all cases, the length of the packed bed is to be selected such that sufficient electric field is achieved on a majority of the pellet surfaces contained in the volume in order to obtain the desired H/D loading the pellets. Depending on the conductivity of the electrolyte, this length may only contain a few layers of pellets. Then, to achieve a larger cell volume, the units can be stacked in series (of electrolytic fluid flow), in parallel, or be designed with comparatively larger-diameter, flatter configurations ("pancake"-like).

In addition to the pellets shown in FIGS. 1–3, additional electrode geometries, for instance those shown in FIGS. 4a, 5, and 6a, can be used. These include inner coated cylinders, coated rod and coated fiber electrodes, as detailed below.

FIG. 4a shows a cross section of an illustrative rod electrode 20 of the present invention. A coolant channel 21 is provided in the center of the rod substrate, while the concave surfaces 22 of the substrate include a plurality of thin film conductive layers 23 generally as described above, and optionally also a diffusion barrier of glass, silica or the like (not shown).

Figure 4C:
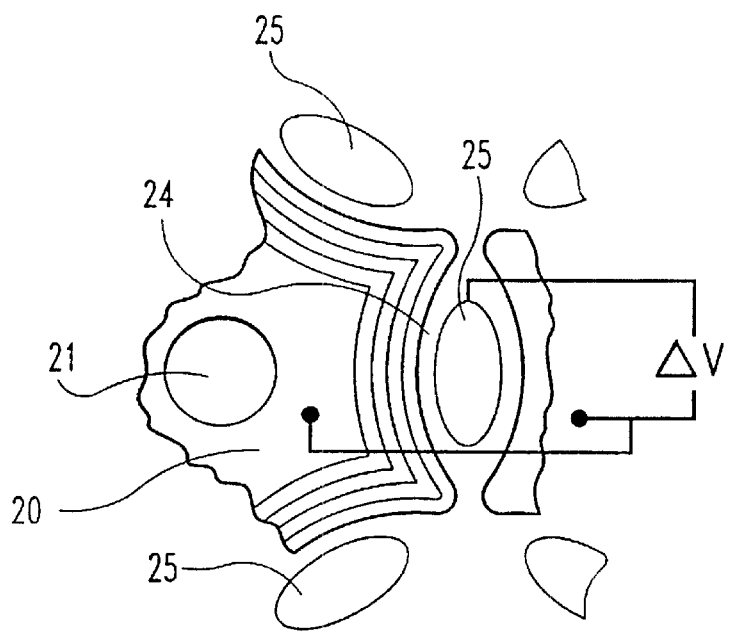
FIGS. 4b–4d provide cross-sectional views that schematically illustrate the use of the rod electrodes of FIG. 4a in an electrolytic cell.
Figure 4B:
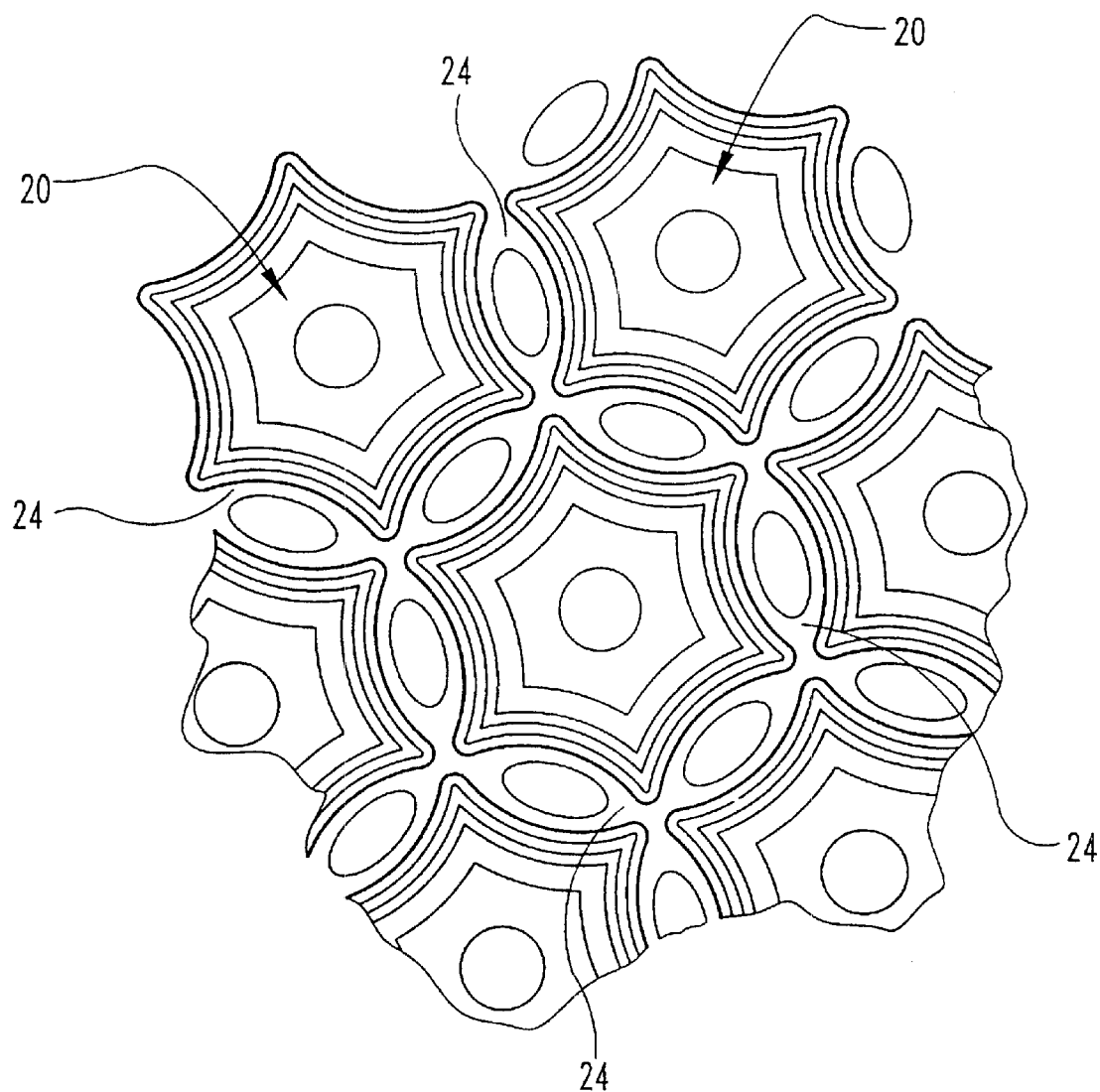

A voltage is applied perpendicular to the flowing electrolyte, with a thin electrode (platinum, nickel, etc.) serving as the anode, located in the center of the electrolyte channel while the rod itself serves as the other electrode (cathode). Thus, when assembled into an array as shown in cross section in FIG. 4b and incorporated into an electrolytic cell, the electrolyte flows in the natural channels 24 formed by the concave surfaces 22 of the rod substrates. To provide the electrical arrangement required to "load" the thin films (e.g. create high densities of deuterium or hydrogen in the solid materials of the thin films), an ovate electrode 25 (FIG. 4c) is spaced in the electrolytic channel 24 and a voltage is applied between this electrode 25 and the rod 20, i.e. between the electrode 25 and rod substrate, i.e. to the thin-film layers on rod 20. To maintain an even electric field on the thin-film surfaces, it may be desirable to use a convex surface (with respect to the electrolyte) such as that occurring on the ovate electrode 25, provided substantially equidistant spacing between the outer thin film 23 and counter electrode 25 in the flow channel 24, is maintained as shown. This geometry then obtains a favorable electric field distribution on the thin-film surfaces, as was achieved in the earlier packed-bed design by the back-to-back design of FIG. 3c. Optimization of the design will involve a trade-off between thermal hydraulics, heat transfer, and reaction rates in the various coatings (reaction rates generally increase with the coating temperature). The latter consideration stipulates a maximum average temperature along the flow direction, favoring a large diameter pancake-like configuration.

Figure 4D:
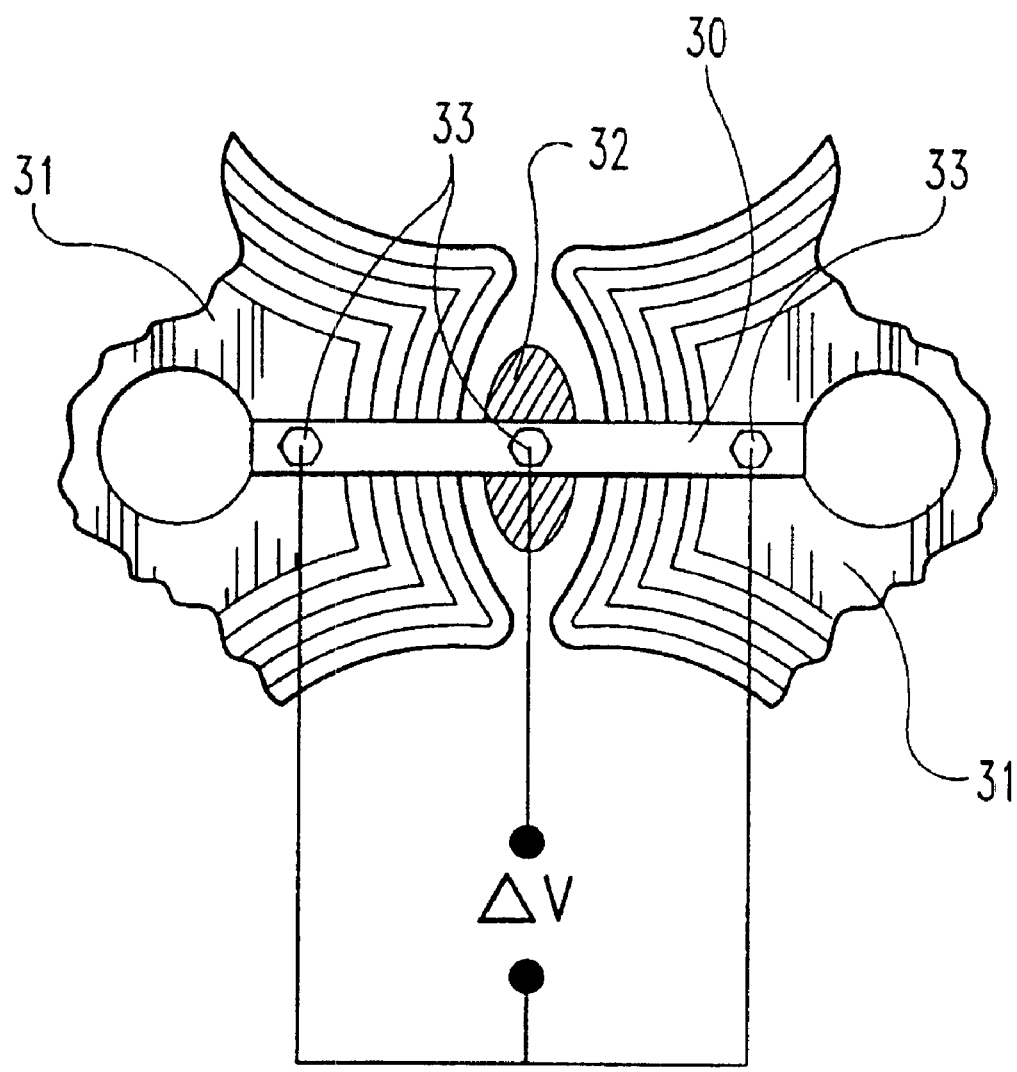

An illustrative support geometry and electrical connection for the counter electrode 32 is shown in FIG. 4d. This support geometry includes a support member 30 composed of a ceramic or other insulating material capable of high temperature operation and chemically compatible with the electrolyte selected. Electrical connections are made through conducting screws, rods, etc. passing through the insulator and connected (threaded, welded, etc.) into the respective metallic electrodes. Support members 30 have adequate mechanical strength to hold rods 31 and counter electrode 32 in a fixed, spaced relationship relative to one another, while causing minimal disturbance of the flow of the electrolyte. For that reason, various curved cross sections, selected to provide smooth flow over the support, may be employed. Support members 30 can be attached to rods 31 and electrodes 32 by any suitable means, including screws, bolts, welding, bonding, or other attachments.

Another possible configuration is shown in FIG. 5. FIG. 5 provides a perspective view of a hollow rod with a thin-film coating provided on its interior surface, in association with a counter-electrode positioned inside the hollow rod. Thus, a cylindrical electrode substrate 26 has thin film conductive layers 27 coated on its interior surface, and counter-electrode 28 is positioned in the center of the hollow rod forming a flow channel 29. In this fashion, electrolyte can pass through the interior channel (see arrows) in the spaces between counter-electrode 28 and thin layers 27. A plurality of such cylindrical electrode combinations can be used to provide an overall electrolytic cell of desired size and capacity. Support and electrical connections for this cylindrical configuration would be analogous to those shown in FIG. 4*d*. With this concentric cylinder design, a uniform field is naturally obtained along the thin-film surfaces, avoiding the need for additional features, such as those incorporated in FIG. 3*c*, to achieve this objective.

Application of the thin-film layers to the concentric cylinder design of FIG. 5 requires that an inner surface be coated. If necessary, e.g. when using certain spraying techniques, the outer tube can be cut in half lengthwise to fully expose the inner surfaces for coating and then be reassembled. The reassembly requires a good electrical connection, but any discontinuities in matching the thin-film layers between the two cut surfaces will have only a negligible local effect on reactions. Thus, manufacture of large length-to-diameter ratio cells, if desired, becomes relatively straightforward.

An electrolytic cell containing a packed bed of concave-surface fibers can also be used to advantage. The fibers (metal, glass, graphite, boron or ceramic substrate) can be extruded, machined or otherwise constructed to provide the characteristic concave surface curvature, e.g. a cross section similar to that illustrated in FIG. 4*a*. The fibers can be arranged in a variety of ways in the cell. Some examples are shown in FIGS. 6 and 7, discussed below.

Figure 6B:
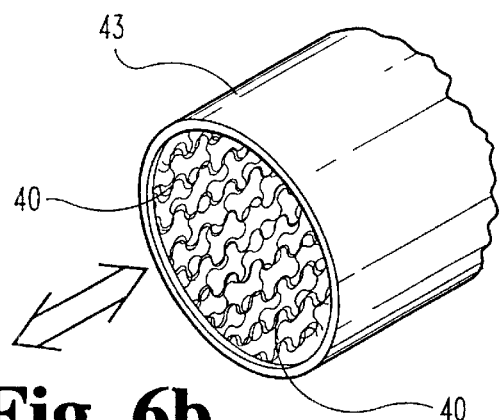
FIGS. 6b and 6c provide an illustrative arrangement of coated fibers, such as that shown in FIG. 6a, in an electrolytic flow cell.
Figure 6C:
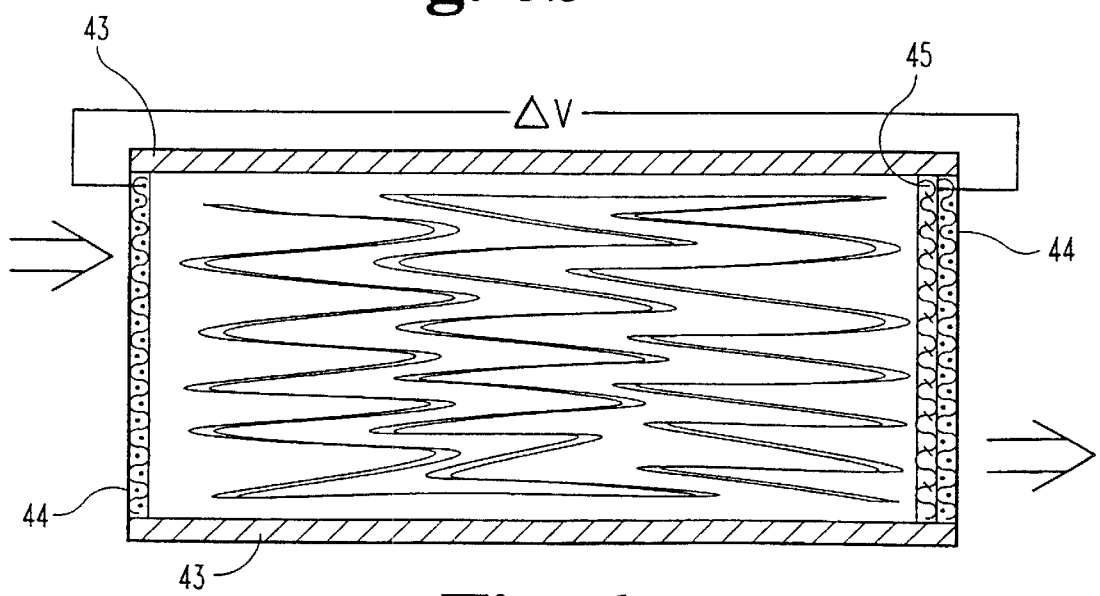

Referring now to FIGS. 6*a* and 6*b*, a fiber 40 is illustrated with a fibrous electrode substrate 41 and a plurality of thin-film conductive layers 42 coated thereon. A flow tube 43 is packed with a mesh of the small cross-section fibers 40. The electrolyte flows through the porous fiber mesh, as illustrated by the arrow. As shown in FIG. 6*c*, thin screens 44 (made of platinum, nickel, etc.) at both ends of the flow tube act as electrodes with a voltage applied between the screens. An electrically insulating porous mesh or fiber layer 45 prevents an electrical short through the metallic coating on the fiber mesh. Also, to prevent a short through the wall of the flow tube housing 43, this tube is made of or coated with a suitable electrically insulating material such as a glass or ceramic. With this embodiment, the fiber-packed cell of FIG. 6*c* is analogous to the packed pellet cell of FIG. 3*a*. Consequently, the back-to-back electrical configuration of FIG. 3*c* is also applicable.

Figure 7A:
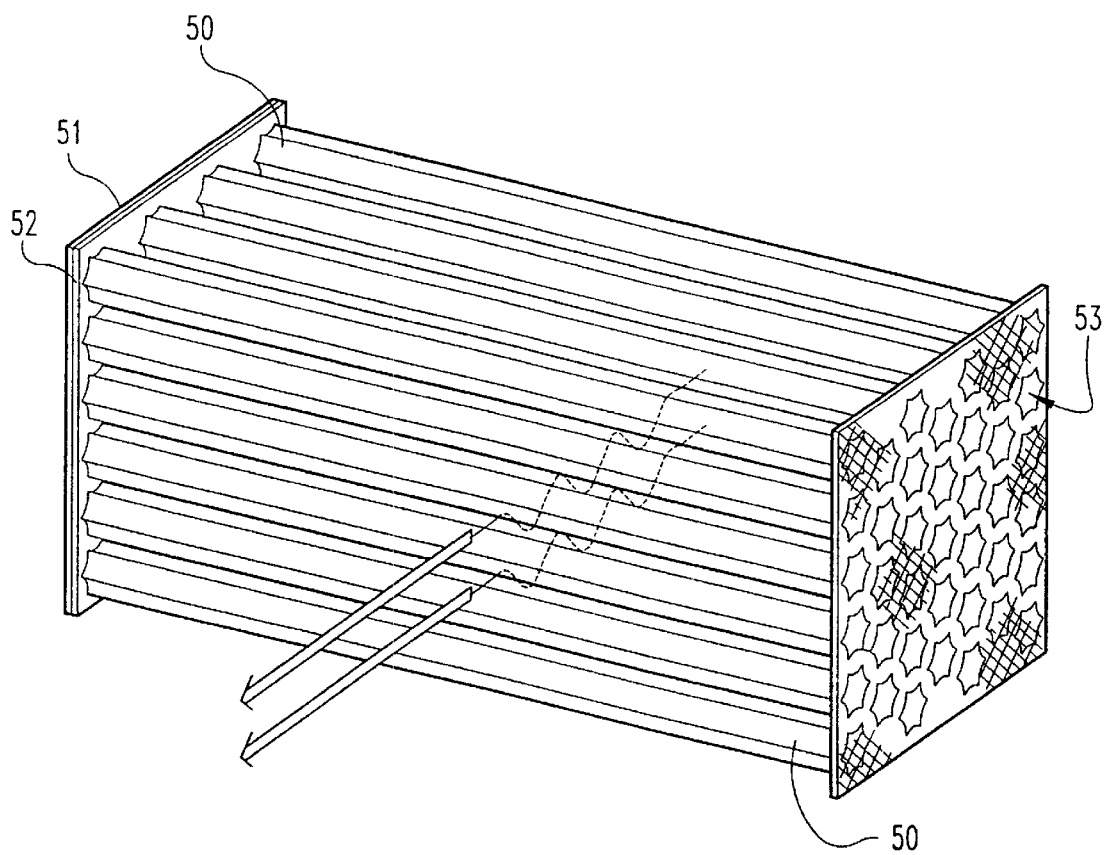
FIGS. 7a and 7b show an alternate arrangement of electrode rods in an electrolytic cell.
Figure 7B:
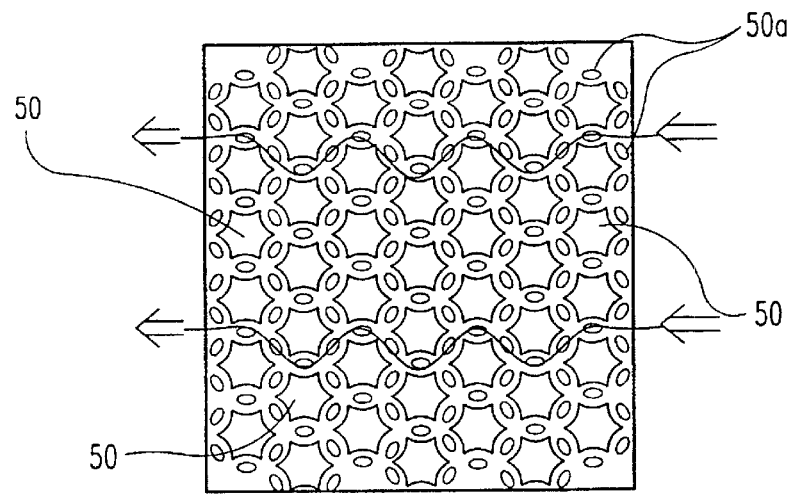

FIGS. 7*a* and 7*b* illustrate another electrolytic cell configuration in which rigid (larger diameter) rods 50 shaped like the fibers 6*d* can be positioned across a flow channel with electrolyte flow going across (transverse to) the rods 50. Thus, a design similar to that illustrated in FIG. 4*a*, including internal coolant channels, can be used for rods 50, and, in that case, coolant flow and electrical connections similar to those shown in 4*b*, 4*c* and 4*d* can be employed. If internal coolant channels 53 are employed, the added coolant flow would be perpendicular to the electrolyte cross flow path in FIG. 7*a*.

Figure 8:
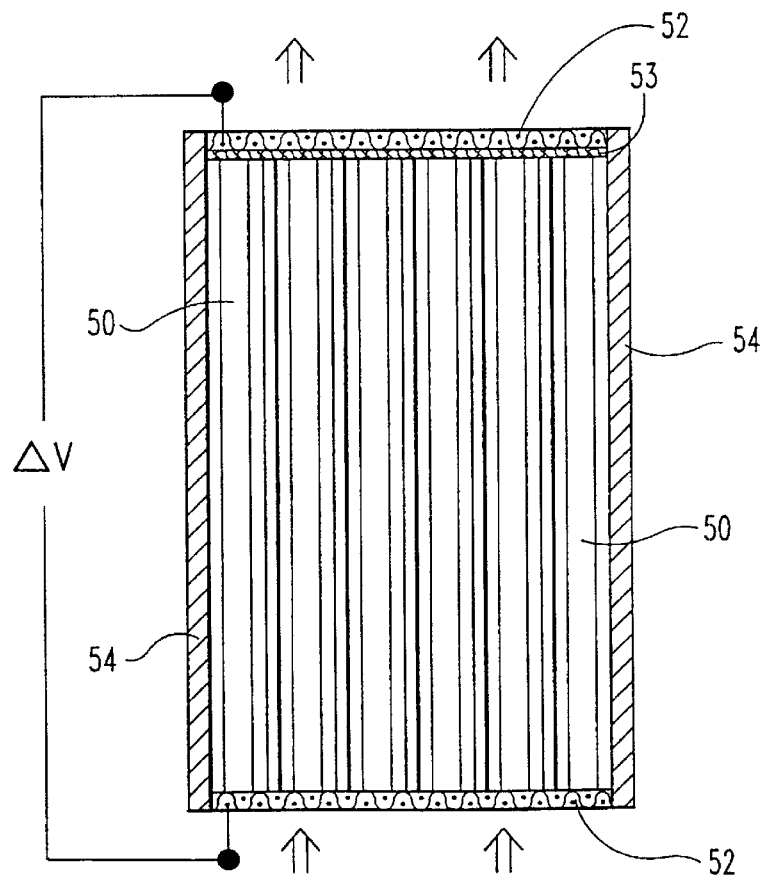
FIG. 8 illustrates electrical connections for cell arrangements, such as those illustrated in FIGS. 7a and 7b.

As shown in FIG. 7*b*, the counter electrodes 50*a* (not coated) could be oval in cross section, or, for smaller-diameter rods, circular wire might be employed without excessive degradation of electric field uniformity. If smaller-diameter rods are employed, screen-type electrical connectors 52 may be used as illustrated in FIG. 8 in order to avoid rod stability problems with cross flow.

This configuration (FIG. 8) is analogous to the screen designs of FIGS. 3*a* and 6*c*. In this case, the coated rods 50 are electrically connected to the lower screen 52. The rods 50 are anchored to, but do not pass through the porous insulator 53, which along with an insulating cell wall, force current flow to the upper screen electrode to pass through the electrolyte in the insulator 53 pores. As in FIG. 3*c*, this design can also be optimized for field uniformity by a back-to-back arrangement and relatively short rod length.

The Figures discussed herein illustrate various electrode designs incorporating multiple concave surfaces and their incorporation into electrolytic cells. All of the designs shown offer convenient ways to provide flow of electrolyte across the electrode surfaces and apply the voltage required for loading of the multilayer thin films, all in a reasonably compact unit cell. Careful attention is devoted to ways to obtain relatively uniform electric fields along coated surfaces to maximize H/D loading while maintaining the concave feature to insure film stability. The flowing electrolyte plays its normal role in the electrolytic process and at the same time serves to remove heat produced in the cell. If additional heat removal capability is desired, a design such as that shown in FIG. 4*a*, having separate internal coolant channels, can be employed. In that case, the coolant selected would not be restricted by requirements for compatibility with the electrolytic fluid.

Figure 9:
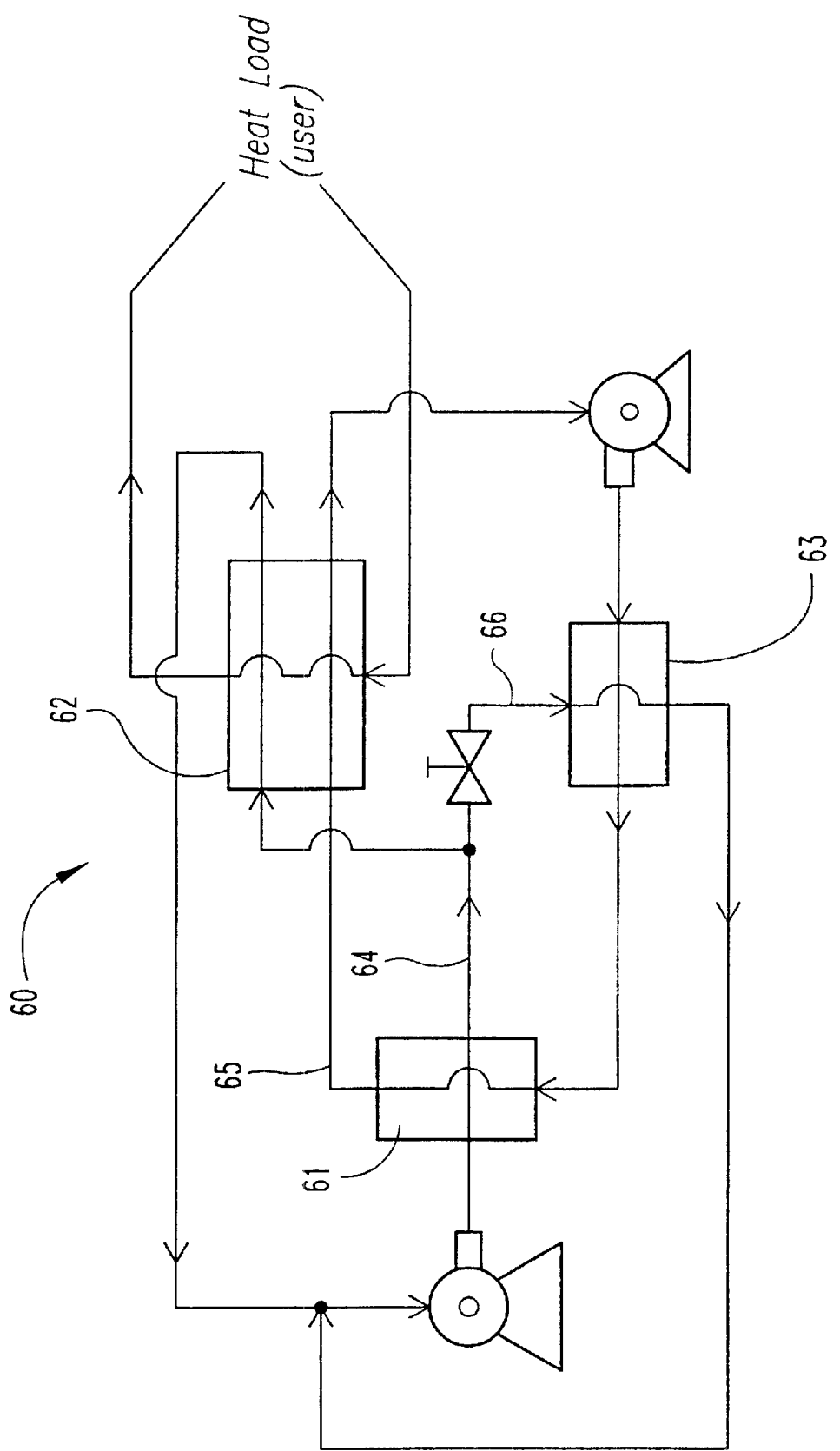
FIG. 9 shows an illustrative overall flow system for use with an electrolytic cell of the invention. In this system, an electrode with the internal coolant channel of FIG. 4c is employed. The hot coolant from the cell is used in the preheater to control the inlet temperature of the electrolyte. Experimental evidence shows that cell performance generally increases with increasing inlet temperatures.

An overall flow system 60 for any of these cells is illustrated in FIG. 9. In this Figure, it is assumed that a coolant configuration of FIG. 4*a* ("external" electrolyte flow plus "internal" coolant flow through electrode) is used for the cell. Both the coolant (line 64) and electrolyte (line 65) leave the electrolytic cell 61 and pass through the primary heat exchanger 62, where the working fluid for the user (heat load) passes. In this regard, it will be understood that although FIG. 9 shows the primary heat exchanger as an integral unit, it could also be a separate unit. A side stream 66 from the hot coolant exiting the cell is used to preheat incoming electrolyte in the preheater heat exchanger 63. In some applications, the coolant/electrolyte may go directly to the heat load (user), but, depending on materials and chemical compatibility, a primary heat exchanger, such as shown in FIG. 9, may be desirable to isolate loops. The heat load (user) can vary greatly, depending on the application. Examples range from low-temperature heat loads, such as a residential or commercial hot water heater, to high-temperature processes, such as a steam turbine for electricity production. The entire system, including materials selection, can be tailored to fit the specific requirements of each application.

Figure 10:
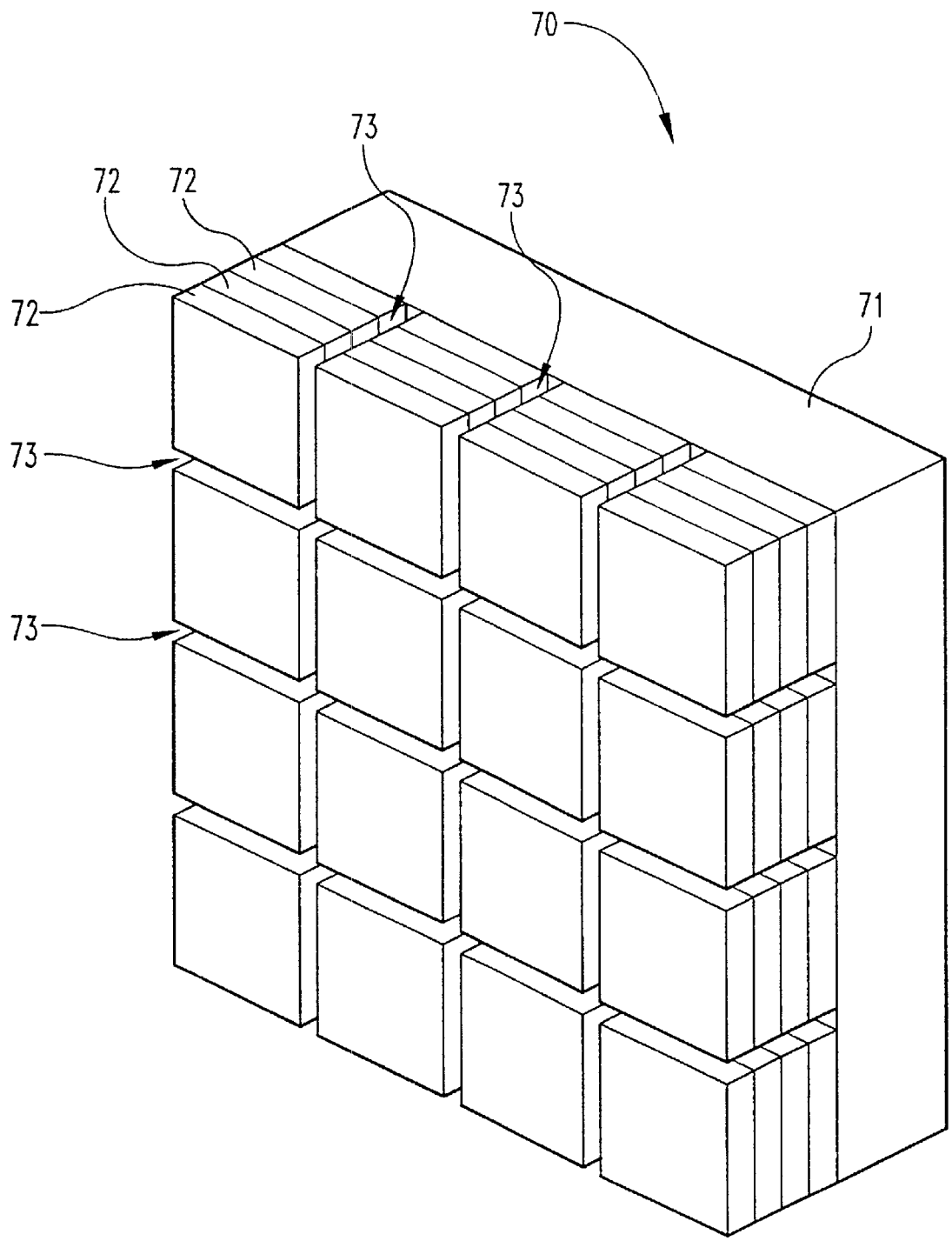
FIG. 10 provides a perspective view of a flat electrode coated with thin-film metal layers of the invention incorporating expansion joints.

Referring now to FIG. 10, shown is another electrode 70 configured so as to resist flaking and cracking. In this case, contrary to the prior electrodes described herein, a design is illustrated which can be used on flat surfaces or on a variety of curved surfaces (vs. just concave surfaces). Electrode 70 includes a flat electrode substrate 71 and a plurality of thin film conductive layers 72 coated thereon. Expansion joints or gaps 73 are formed in the layers 72, for example by cutting mechanically or with a laser. Alternately, a masking technique could be used to form the gap pattern during sputtering the coating layers on. In this manner, the expansion of layers 72 is accommodated by expansion joints 73, and flaking and cracking of the layers 72 is reduced.

Figure 11:
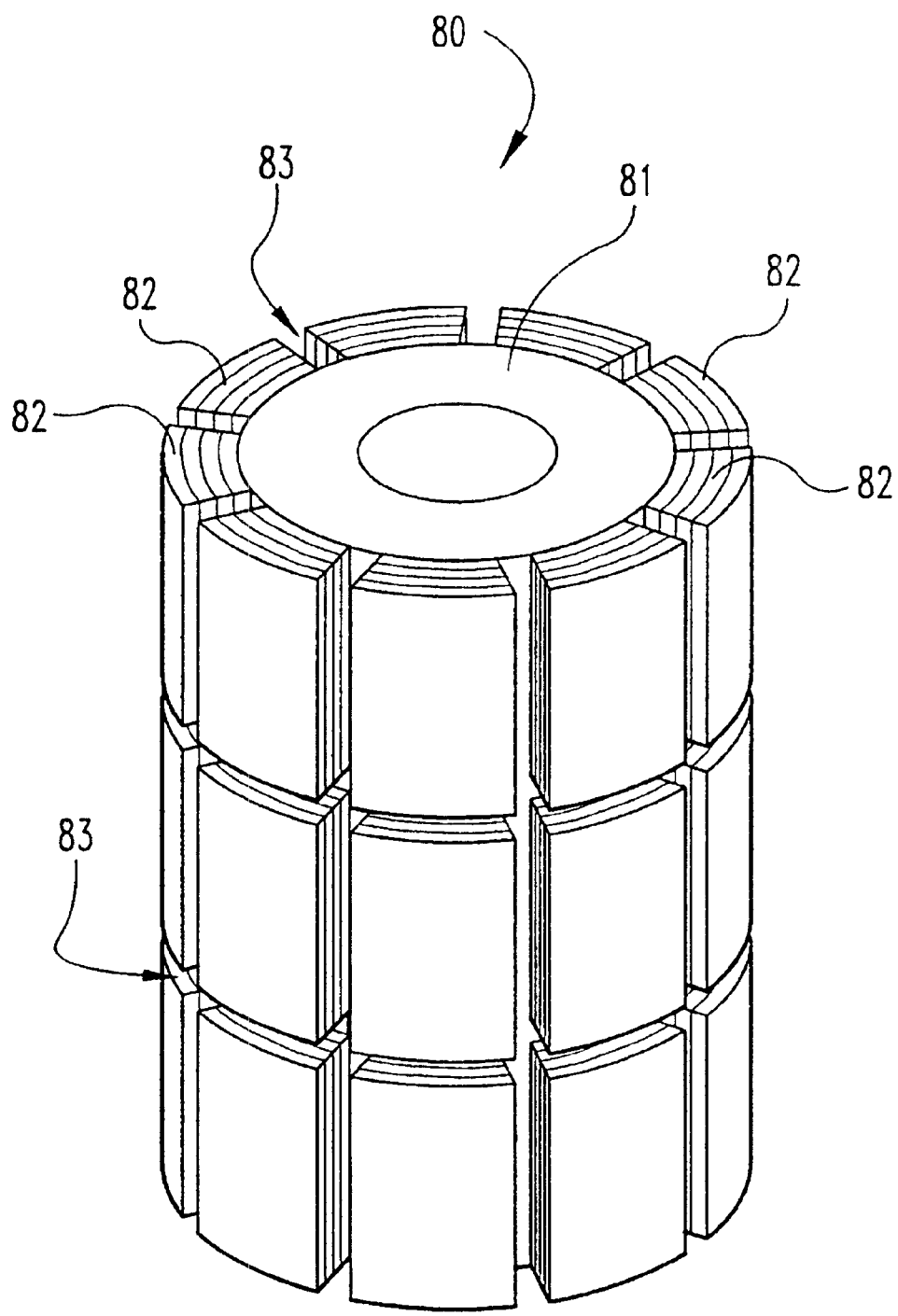
FIG. 11 provides a perspective view of a cylindrical electrode coated with thin-film metallic layers of the invention incorporating expansion joints.

FIG. 11 shows another electrode 80 having expansion joints. Electrode 80 includes a cylindrical substrate 81, with thin-film layers 82 coated thereon, and expansion joints 83 in the layers 82.

The configuration of the electrolytic cell can vary depending on the electrolytic process of interest and, as examples, may serve as a small power source or as an energy storage cell (battery). The inventive cells can thus be used in applications similar to those for the spherical bead hydrogen cells described in U.S. Pat. Nos. 4,943,355; 5,036,031; 5,318,675 and 5,372,688. In these cases, a variety of electrolytes, such as $LiSO_4$ in $H_2O$, $LiSO_4$ in $D_2O$, $NaCl$ in $H_2O$, etc., can be employed. Preferred electrodes and cells of the invention provide a number of advantages over the spherical bead cells described in the above-mentioned patents, including stability of films during high-power operation and the capability to operate at higher temperatures. In addition, the use of multilayer thin films as described herein provides for higher output power densities than do single or double layers. Cells of the invention may thus be used for a wide variety of applications such as local heating in electronics and electric vehicles, and for various additional applications requiring a heat source, an electrical energy source, energy storage, and/or transmutation.

TABLE 3

EXPERIMENTAL
Summary of Runs

| Run ID | Packing* | Run 10.0 Duration (hours) | Excess Power (W) |
|---|---|---|---|
| 5 | #59 PS/NPNPN | 520 | −2 ± 0.5 |
| 7A | C1 PS/PN-E | 197 | −4 ± 0.8 |
| 8 | #60 PS/N | 311 | −0.1 – 0.9 |
| 11 | #63 PS/P | 211 | −0.1 – 0.9 |
| 13 | #61 GL/N | 293 | −0.1 – 0.9 |
| 18e | #76 PS/N | 358 | −0.1 – 0.9 |

*See Table 4 for microsphere data

Electrolytic Cell Description and Operation

Figure 12:
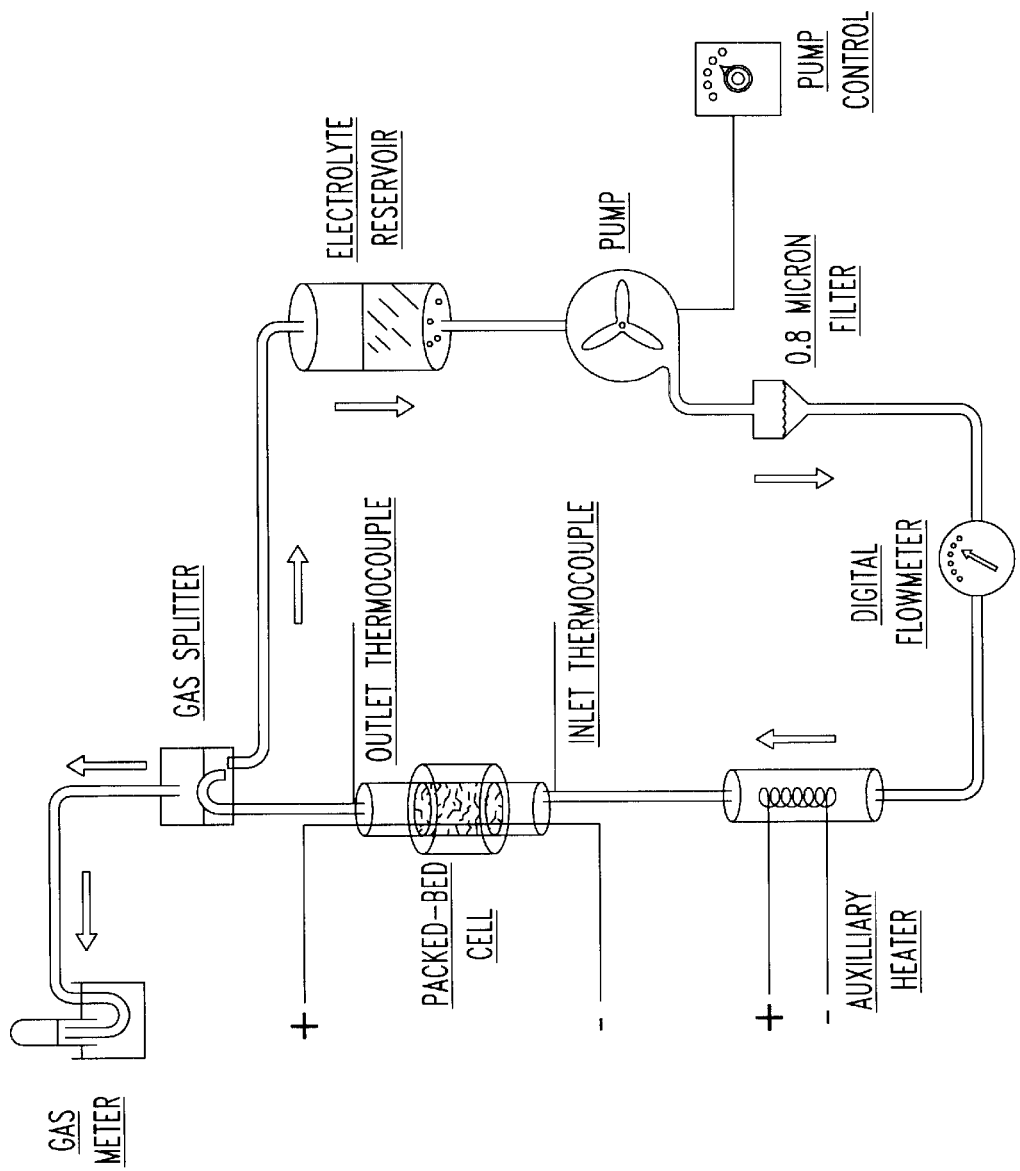
FIG. 12 shows the electrolytic cell employed for the six runs that provided the data shown in FIG. 2c. The electrolyte is pumped through a filter and enters an auxiliary pre-heater, which adjusts the inlet temperature to the packed bed. The electrolyte flows through the bed that is packed with thin-film coated plastic beads and exits to a gas splitter, returning to a reservoir and the pump. The coated beads serve as the cathode while a plate at the exit side of the cell serves as the anode. A difference in the temperature measured at the inlet and outlet tubes provides a measure of excess heat production.

Six experimental thin-film-type runs, summarized in Table 3, were performed which provide insight into the selection of optimal materials for thin films in accordance with aspects of the present invention. The general configuration of the electrolytic cell is shown in FIG. 12. About 1000 microspheres (~0.5 cm³ volume) were used in the packed-bed cell. A titanium anode was employed in the runs. The preheater allows control of the entering temperature of the electrolyte (1 molar $LiSO_4/H_2O$), with flow rates of ~11 ml/min. Voltages across the bed were held at ~2–3 V, with several mA of current, giving an electrical input power of approximately 0.06 W. Inlet-outlet thermocouples provided a measure of the temperature increase of the flowing electrolyte. Positive, but often very small, increases in temperature across the cell, ranging from 0.01 to 4° C., were observed in all cases.

Loading of hydrogen into the thin film is done at low ~25° C.) temperatures, requiring several hours, as observed by an initial increase in the voltage across the bed, followed by an eventual equilibrium voltage level of +2–3 V. Then the cell inlet temperature is slowly raised (over 4–8 hours) to the maximum allowed with the present plastic cell construction, near 60–70° C. Run times of several weeks were typical (Table 3).

Initial runs (#5, 7a, 8) employed a cell with all plastic fittings with the exception of the pressure and flow meters and the pump. Later runs substituted all plastic components ("clean cell" design) except for the electrodes. A filter fitted with 0.8 μm pore size filter paper was employed in the loop (FIG. 12) to collect any fine particles entering the electrolyte, either from film surfaces or from other parts of the system.

Thin-Film Runs

Characteristics of the thin-film coated microspheres used are summarized in Table 4. The following nomenclature is adopted: P: palladium, N: nickel, PS: Polystyrene, G: glass. Thus a PS/P/N microsphere has a plastic core with a first coating of palladium and a second coating of nickel. All coatings were sputtered on, unless denoted as -E which used electroplating. The layer masses shown are based on "witness" plate weight measurements during sputtering; hence, they are not considered highly accurate compared to element data taken by Neutron Activation Analysis (NAA) after a run. Excess power measurements varied from run to run, but the PS/N run was typical for single coatings. It gave a temperature rise of the order of 0.6° C. throughout the run, representing an output of 0.5±0.4 W. Multi-layers gave larger excess power, approaching 4W. Calibration corrections due to heat losses and flow-pattern variations limited the measurement accuracy. More precise calorimetry is in use in several laboratories studying excess power from similar cells, but the present cell design focused on ease of reaction product measurements.

Scanning electron microscope (SEM) photographs of the microspheres confirmed that a very smooth surface was achieved but with a small-scale, rough structure uniformly distributed over it. Some erosion of small particles and occasional ejection of larger "flakes" from the film occurs during operation, as detected by debris collected by the loop filter. Concurrently, various fragile looking bead-like and fiber-like structures are typically visible on the film surface after electrolysis.

Reaction Product Analysis Methods

Reaction product measurements have utilized a combination of NAA, Secondary Ion Mass Spectrometry (SIMS), Energy Dispersive X-ray (EDX) analysis, and Auger Electron Spectroscopy (AES). NAA can measure total quantities of elements in a sample containing multiple microspheres, while the other techniques are restricted to probing a local area on single microspheres. Due to variations among microspheres arising from location in the packed bed and other effects, this difference in technique is responsible for some of the variations in the results.

TABLE 4

Data For Various Thin-Film Microspheres

| Layer | Volume (cc) | Mass of Layer (g) | # of atoms |
|---|---|---|---|
| PS/N/P/N/P/N (#59; use in Run #5) | | | |
| PS (core) | 6.22E − 04 | 6.09E − 04 | |
| Ni (300A) | 1.06E − 07 | 9.41E − 07 | 9.64E + 15 |
| Pd (500A) | 1.78E − 07 | 2.11E − 06 | 1.19E + 18 |
| Ni (400A) | 1.41E − 07 | 1.25E − 06 | 1.29E + 18 |
| Pd (800A) | 2.82E − 07 | 3.38E − 06 | 1.90E + 16 |
| Ni (350A) | 1.23E − 07 | 1.10E − 06 | 1.13E + 16 |

TABLE 4-continued

Data For Various Thin-Film Microspheres

| Layer | Volume (cc) | Mass of Layer (g) | # of atoms |
|---|---|---|---|
| PS/P/N-E (#01: used in Run #7A) | | | |
| PS (core) | 6.22E − 04 | 6.09E − 04 | |
| Pd (1 micron) | 3.54E − 06 | 4.24E − 05 | 2.39E + 17 |
| Ni (0.5 micron) | 1.78E − 06 | 1.57E − 05 | 1.61E + 17 |
| PS/N (#60: used in Run #8) | | | |
| PS | 8.22E − 04 | 6.09E − 04 | |
| Ni (2650A) | 9.34E − 07 | 8.31E − 06 | 8.52E + 16 |
| PS/P (#83: used in Run #11) | | | |
| PS (core) | 6.22E − 04 | 6.09E − 04 | |
| Pd (2000A) | 7.05E − 07 | 8.48E − 06 | 4.76E + 16 |
| G/N (#61: used in Run #13) | | | |
| Glass (core) | 6.22E − 04 | 1.01E − 03 | |
| Ni (850A) | 3.00E − 07 | 2.67E − 08 | 2.73E + 18 |
| PS/N (#76: used in Run #18C) | | | |
| PS | 6.22E − 04 | 6.09E − 04 | |
| Ni (3000A) | 1.06E − 06 | 9.41E − 08 | 9.64E + 16 |

Diameter of PS base = 1.06E − 01 cm

To distinguish from impurity contributions, both the microspheres and electrolytes were analyzed before and after the run. Sampling, after a run was done by disassembling the cell and removing microspheres from the top (cathode end) layer of the packed bed. (The 1000 microspheres in the bed result in approximately 3–5 layers total.) These microspheres were selected due to accessibility and because the higher electric field in that region should make this layer most reactive. NAA of the microspheres was carried out at the University of Illinois' (UI) TRIGA research reactor, typically using samples of 10 microspheres. Techniques for short- and long-lived NAA (Parry, 1991) were performed to determine the presence of nine elements: Ag, Cu, Al, Fe, Cr, Zn, Ni, Co, and V. Typical detection limits were of the order of 2 ppm, with a precision of 2–10%. NAA was also employed to study key isotope ratios (e.g., Cu and Ag) for comparison to natural abundance. Calibration used certified liquid standards from the National Institute of Standards and Technology. Ores containing known quantities of these elements were analyzed simultaneously in all runs for quality control.

The SIMS analysis employed a Cameca IMDS 5F unit operating with 8-keV oxygen primary beam in the positive ion mode. Scans of key isotopes were made using single microspheres in a low-resolution (2,000 mass resolution) mode at several depths of interest (see FIGS. 3a and b of M-P 96). High-resolution (40,000 mass resolution) scans were then done to resolve any interferences involving important isotopes. Calibration for the SIMS sensitivity was done using the concentrations of the nine elements measured by NAA. SIMS was used to determine isotope ratios except for the Cu and Ag ratios that were determined explicitly by NAA.

The EDX analysis used a Field Emission Electron Microscope (Hitachi S-800) operating in the energy dispersion analysis mode to detect elements with atomic concentrations above 1%. This measurement largely served as added confirmation of NAA measurements. AES was used in a sputtering mode to perform semi-quantitative depth profiling for the major element species above ~1 atom %.

While the invention has been illustrated and described in detail in the foregoing description, the same is to be considered as illustrative and not restrictive in character, it being understood that only the preferred embodiments have been described and that all changes and modification that come within the spirit of the invention are desired to be protected. In addition, all publications cited herein are indicative of the level of skill in the art and are hereby incorporated by reference as if each had been individually incorporated by reference and fully set forth.

What is claimed is:

1. A concave-surface conductive article for use as an electrode, comprising an electrode substrate having at least one concave surface, and at least one thin-film conductive layer coated on said concave surface;
   wherein said layer includes a metal selected from Table 1; and
   wherein an outer surface of an outermost one of said thin conductive layers is coated with a hydrogen diffusion barrier.

2. The conductive article of claim 1, wherein the hydrogen diffusion barrier includes a member selected from the group consisting silica, chromium, and iron.

3. A concave-surface conductive article for use as an electrode, comprising an electrode substrate having at least one concave surface and a plurality of thin-film conductive layers coated on said concave surface, wherein said layers include alternating layers of two differing conductive materials selected from Table 1.

4. A concave-surface conductive article for use as an electrode, comprising an electrode substrate having at least one concave surface and at least one thin-film conductive layer coated on said concave surface, wherein said conductive article is a pellet.

5. A conductive article of claim 4, which is a hollow pellet.

6. A concave-surface conductive article for use as an electrode, comprising an electrode substrate having at least one concave surface and at least one thin-film conductive layer coated on said concave surface, wherein said conductive article is a rod.

7. A concave-surface conductive article for use as an electrode, comprising an electrode substrate having at least one concave surface and at least one thin-film conductive layer coated on said concave surface, wherein said conductive article is a fiber.

8. An electrolytic cell, comprising first and second electrodes, at least one of which includes a conductive article having an electrode substrate with at least one concave surface, and at least one thin conductive layer coated on said concave surface.

9. A flake-resistant thin-film layer electrode for use in an electrolytic cell, comprising:
   an electrode substrate including a surface; and
   at least one thin conductive layer coated on said concave surface which is subjected to compressive force upon expansion of said thin conductive layer.

10. An electrode of claim 9, wherein said conductive layer includes a metal selected from Table I.

11. An electrode of claim 10, including a plurality of said thin layers.

12. An electrode of claim 11, including alternating layers of at least two differing conductive materials selected from Table 1.

13. A flake-resistant thin-film electrode for use in an electrolytic cell, comprising:
   an electrode substrate;
   a plurality of thin-film conductive layers coated on said electrode substrate; and expansion gaps provided in said thin conductive layers so as to reduce flaking or cracking of the thin conductive layers when expanded.

14. An electrode for an electrolytic cell, comprising alternating thin-film layers of two conductive materials, said conductive materials having a difference in Fermi energy levels of at least about 1 eV and substantial solubility and diffusivity for hydrogenous ions; said two conductive materials further providing an interface at which substantially no interdiffusion occurs.

15. An electrode of claim 14 wherein the conductive materials are selected to give sets of complex nuclei selected from those in FIG. 2d.

16. An electrode of claim 15, wherein the complex nuclei are selected to provide energy release, or to provide lower or higher mass reaction products.

17. An electrode for an electrolytic cell, comprising a substrate and a first thin-film conductive layer on the substrate, the substrate and first thin film conductive layer having a difference in Fermi energy level of at least about 1 eV.

18. An electrode of claim 17 wherein the conductive material is selected to give sets of complex nuclei selected from those shown in FIG. 2d.

19. An electrode of claim 18, wherein the complex nuclei are selected to provide energy release, or to provide lower or higher mass reaction products.

20. An electrode for an electrolytic cell, comprising a substrate and thin conductive layers with an outer thin coating selected to serve as a hydrogen diffusion barrier and have a difference in Fermi energy level relative to the underlying thin conductive layer of at least about 1 eV.

21. An electrode of claim 20 wherein the conductive layers include a conductive material selected to give sets of complex nuclei selected from those shown in FIG. 2d.

22. An electrode of claim 21, wherein the complex nuclei are selected to provide energy release, or to provide lower or higher mass reaction products.

23. An electrolytic cell which comprises a first electrode including a bed of pellets, each having a thin-film conductive layer, said cell also having means for increasing on average the electric field strength on said thin-film conductive layer.

24. An electrolytic cell including an anode, a bed of pellets each having a thin-film conductive layer, a first cathode member in electrical contact with an end of said bed of pellets, and a second cathode member in contact with said bed of pellets at a position intermediate to said first cathode member and said anode.

25. A conductive pellet for use in a cathode in an electrolytic cell, comprising a substrate, a first layer including a metal selected from one of the Fermi level groups in Table I, and a second layer adjacent the first layer including a metal selected from a different Fermi level group in Table I.

26. A conductive pellet of claim 25, wherein at least one of said layers includes a conductive material selected to give sets of complex nuclei selected from those shown in FIG. 2d.

27. A conductive pellet of claim 26, wherein the complex nuclei are selected to provide energy release, or to provide lower or higher mass reaction products.

* * * * *

UNITED STATES PATENT AND TRADEMARK OFFICE
CERTIFICATE OF CORRECTION

PATENT NO. : 6,599,404 B1  
DATED : July 29, 2003  
INVENTOR(S) : George H. Miley It is certified that error appears in the above-identified patent and that said Letters Patent is hereby corrected as shown below:

<u>Title page</u>,
Insert Item:
-- [73]  Assignee:  LATTICE ENERGY L.L.C,
                   Chicago, IL (US) --

Signed and Sealed this

Thirty-first Day of August, 2004

JON W. DUDAS
*Director of the United States Patent and Trademark Office*